US009224533B2

(12) United States Patent
Kanno

(10) Patent No.: US 9,224,533 B2
(45) Date of Patent: Dec. 29, 2015

(54) WIRELESS ELECTRIC POWER TRANSMISSION APPARATUS

(71) Applicant: Panasonic Corporation, Osaka (JP)

(72) Inventor: Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 484 days.

(21) Appl. No.: 13/686,242

(22) Filed: Nov. 27, 2012

(65) Prior Publication Data

US 2013/0134797 A1    May 30, 2013

Related U.S. Application Data

(60) Provisional application No. 61/564,382, filed on Nov. 29, 2011.

(51) Int. Cl.
*H01F 27/00* (2006.01)
*H01F 38/14* (2006.01)
*H02J 17/00* (2006.01)
*H04B 5/00* (2006.01)

(52) U.S. Cl.
CPC ............... *H01F 38/14* (2013.01); *H02J 17/00* (2013.01); *H04B 5/0037* (2013.01)

(58) Field of Classification Search
CPC ...................................................... H02J 5/005
USPC ........................................................ 307/104
See application file for complete search history.

(56) References Cited

U.S. PATENT DOCUMENTS 8,508,076 B2 * 8/2013 Kanno .......................... 307/104
8,698,350 B2 * 4/2014 Kanno ............................ 307/19

2008/0278264 A1  11/2008  Karalis et al.
2009/0174263 A1   7/2009  Baarman et al.
2010/0219696 A1   9/2010  Kojima
2011/0037322 A1   2/2011  Kanno

FOREIGN PATENT DOCUMENTS

JP       2002-152997 A      5/2002
JP       2010-136464 A      6/2010
JP       2010-200571 A      9/2010
JP       2011-041464 A      2/2011
JP       2011-229360 A     11/2011
WO    WO 2011/086445 A1    7/2011

OTHER PUBLICATIONS

Extended European Search Report for corresponding European Application No. 12853330.4 dated Nov. 5, 2014.
International Search Report for corresponding International Application No. PCT/JP2012/007620 mailed Feb. 26, 2013.
Form PCT/ISA/237 for corresponding International Application No. PCT/JP2012/007620 dated Feb. 26, 2013 and partial English translation.
Co-pending U.S. Appl. No. 13/686,076, filed Nov. 27, 2012.
Co-pending U.S. Appl. No. 13/686,104, filed Nov. 27, 2012.

* cited by examiner

*Primary Examiner* — Stephen W Jackson
(74) *Attorney, Agent, or Firm* — Renner, Otto, Boisselle & Sklar, LLP

(57) ABSTRACT

A wireless electric power transmission apparatus as an embodiment of the present disclosure includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; an oscillator which is connected to one of the two antennas that transmits RF power; and a control section which controls a transmission frequency according to the magnitude of the electric power to be transmitted from one of the two antennas to the other. fs/fp is set to be a value that is less than one.

15 Claims, 31 Drawing Sheets

- - - fs/fp = 1.0

—— FUNCTION OF fs/fp = k

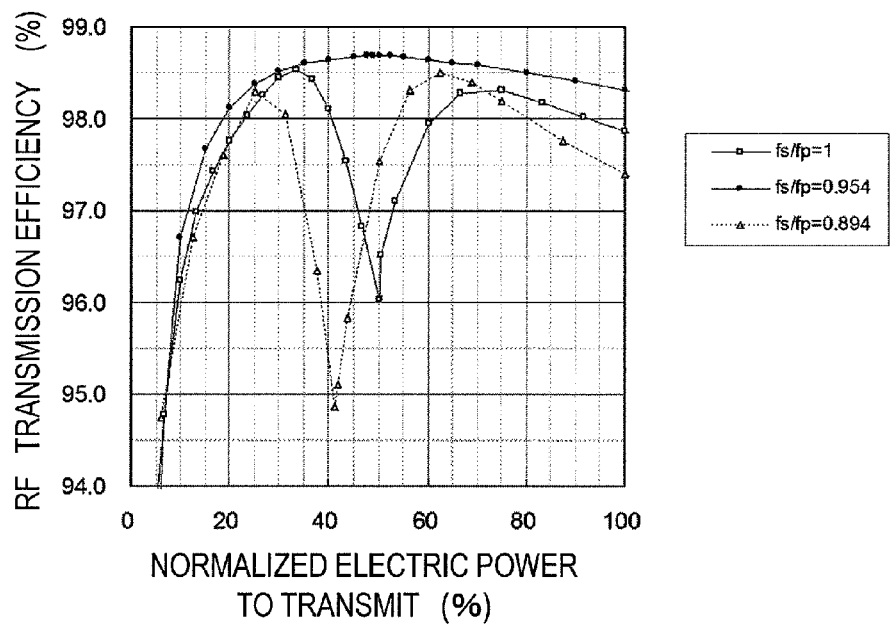
FIG.20A  K=0.3
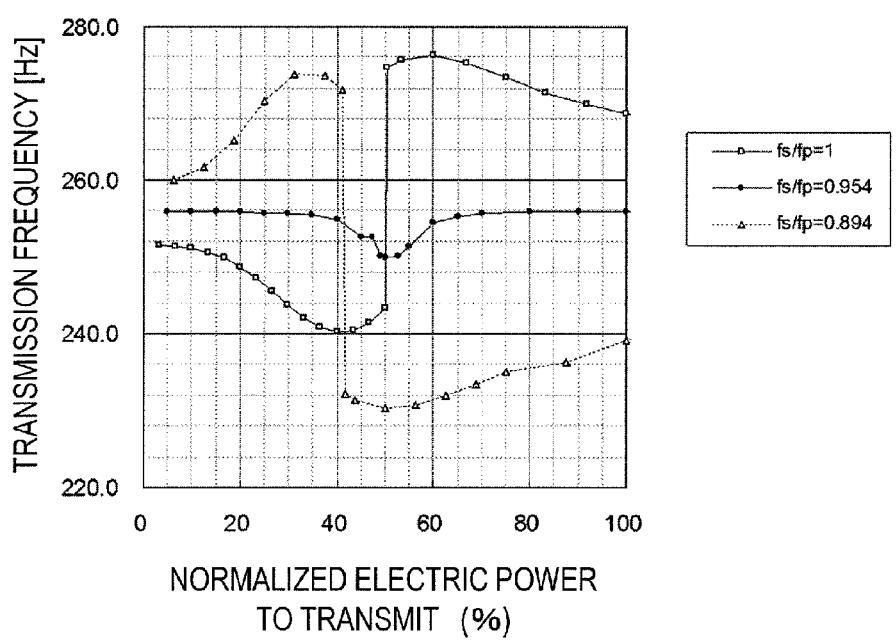
FIG.20B  K=0.3

WIRELESS ELECTRIC POWER TRANSMISSION APPARATUS

This application claims priority under 35 USC §119(e) to U.S. Provisional Application No. 61/564,382 filed on Nov. 29, 2011, the entire contents of which are incorporated herein by reference.

BACKGROUND

1. Technical Field

The present disclosure relates to a resonant magnetic coupling type non-contact power transmission technology for transmitting electric power wirelessly using resonant magnetic coupling.

2. Description of the Related Art

United States Patent Application Publication No. 2008/0278264 (FIGS. 12 and 14) discloses a new type of wireless energy transfer system for transferring energy wirelessly (through a space) from one of two resonators to the other, and vice versa. That wireless energy transfer system couples those two resonators with each other via the evanescent tail of the oscillation energy of the resonant frequency that is produced in the space surrounding those two resonators, thereby transferring the oscillation energy wirelessly (i.e., by a non-contact method).

Meanwhile, the traditional electromagnetic induction technology is still used today. Many of electronic devices, to which these electric power transmission technologies are applied, often demand supply of a constant voltage after having received electric power with a constant voltage and gone through some kind of power conversion, voltage division, energy transfer and other blocks. For example, as for an audiovisual device such as a TV set, such a device usually receives electric power through an AC outlet that supplies AC power with a substantially constant voltage and individual circuits in the device, which eventually consume the power supplied, operate with a predetermined voltage maintained. Even if the brightness on the screen has varied, such a variation can also be coped with by changing the amount of current to flow. Such an operation of receiving electric power with a constant voltage from a power supply and outputting the power with the constant voltage to a load will be referred to herein as a "constant voltage operation".

SUMMARY

The prior art technique needs further improvement in view of maintaining high-efficiency transmission performance when the system needs to perform a constant voltage operation, no matter whether the power to be transmitted is large or small.

One non-limiting, and exemplary embodiment provides a wireless power transmission system that can output power with a predetermined output voltage in response to power received with a predetermined input voltage and that can maintain high efficiency not just when transmitting a huge amount of power but also when transmitting only a small amount of power as well.

In one general aspect, a wireless electric power transmission apparatus as an embodiment of the present disclosure includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; an oscillator which is connected to one of the two antennas that transmits RF power; and a control section which controls a transmission frequency according to the magnitude of the electric power to be transmitted from one of the two antennas to the other. fs/fp is set to be a value that is less than one.

While transmitting electric power between two antennas via resonant magnetic coupling, a wireless electric power transmission apparatus as an embodiment of the present disclosure can maintain high efficiency in a broad electric power transmission range.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 20A is a graph showing how the transmission efficiency changes with the electric power to transmit in a situation where k=0.3.

FIG. 20B is a graph showing how the transmission frequency needs to change with the electric power to transmit to achieve the transmission efficiency shown in FIG. 18A.

DETAILED DESCRIPTION

Figure 1:
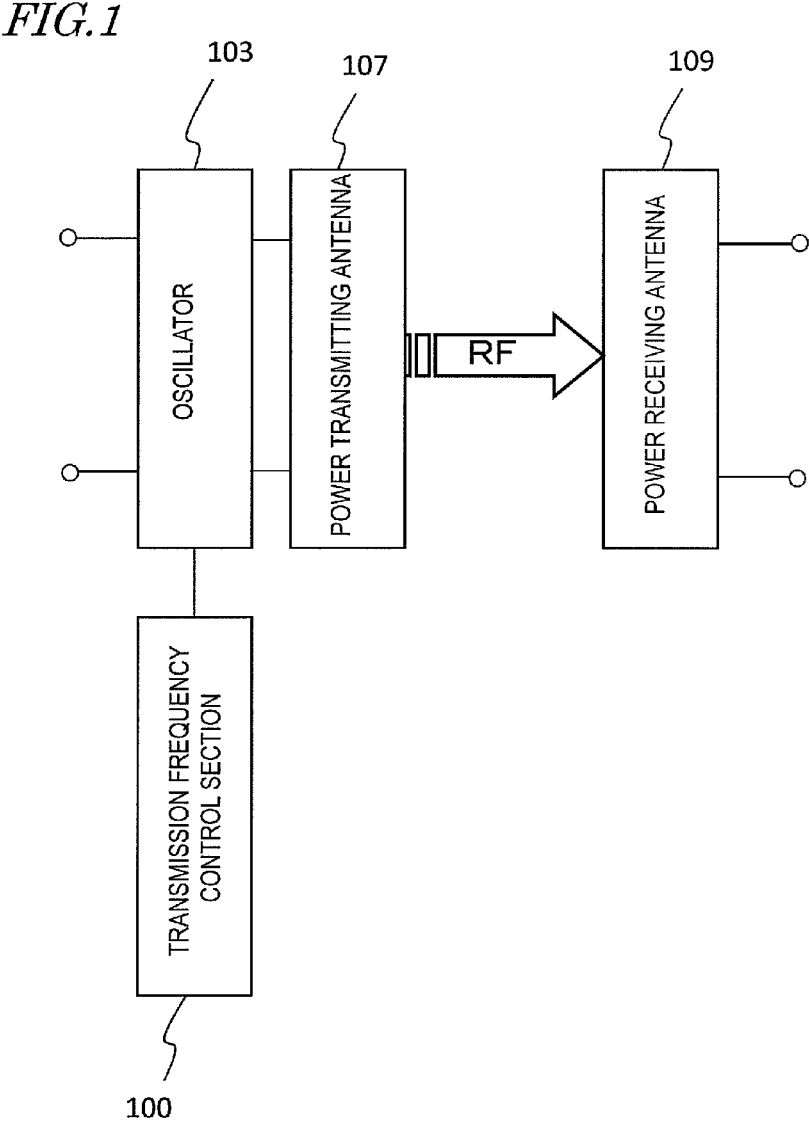
FIG. 1 illustrates an exemplary basic configuration for a wireless electric power transmission apparatus as an embodiment of the present disclosure.

However, it is difficult for the wireless energy transfer system disclosed in United States Patent Application Publication No. 2008/0278264 to always maintain a high efficiency transfer characteristic in performing such a constant voltage operation all the time, no matter whether the power to be transmitted is big or little.

In order to overcome the problems described above, the present inventors perfected an embodiment of our invention and an object of the present disclosure is, first and foremost, to provide a wireless electric power transmission apparatus that can always maintain sufficiently high efficiency, not just when the power to transmit is big but also when only a little power needs to be transmitted.

In one general aspect, a wireless electric power transmission apparatus as an embodiment of the present disclosure includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; an oscillator which is connected to one of the two antennas that transmits RF power; and a control section which controls a transmission frequency according to the magnitude of the electric power to be transmitted from one of the two antennas to the other. fs/fp is set to be a value that is less than one.

In one embodiment, the control section changes a relation between the transmission frequency and the electric power according to a standard value that depends on a coupling coefficient k between the two antennas and fs/fp.

In another embodiment, in a situation where the fs/fp value is less than the standard value, the control section sets the transmission frequency to be a value that falls within a first frequency range if the electric power is smaller than a reference value P1 but sets the transmission frequency to be a value that falls within a second frequency range, which is lower than the first frequency range, if the electric power is greater than the reference value P1.

In another embodiment, in a situation where the fs/fp value is greater than the standard value, the control section sets the transmission frequency to be a value that falls within a first frequency range if the electric power is greater than a reference value P1 but sets the transmission frequency to be a value that falls within a second frequency range, which is lower than the first frequency range, if the electric power is smaller than the reference value P1.

In another embodiment, in a situation where the fs/fp value is greater than a standard value that depends on the coupling coefficient k, the control section sets the transmission frequency to be a value that falls within a first frequency range if the electric power is greater than a reference value P1 but sets the transmission frequency to be a value that falls within a second frequency range, which is lower than the first frequency range, if the electric power is smaller than the reference value P1, and in a situation where the fs/fp value is less than the standard value, the control section sets the transmission frequency to be a value that falls within a first frequency range that is lower than the frequency fp if the electric power is greater than the reference value P1 but sets the transmission frequency to be a value that falls within a second frequency range, which is higher than the first frequency range, if the electric power is smaller than the reference value P1.

In another embodiment, if the fs/fp value agrees with the standard value that depends on the coupling coefficient k, the control section keeps the transmission frequency constant irrespective of the electric power to transmit.

In another embodiment, the standard value is a monotonically decreasing function of the coupling coefficient k.

In another embodiment, the standard value is less than one and its magnitude is between $-0.7309 \times k^2 - 0.0269 \times k + 0.9862$ and $0.08 \times k^2 - 0.357 \times k + 1.0944$.

In another embodiment, the control section measures transmission efficiency by transmitting electric power wirelessly with the transmission frequency changed in multiple different control patterns, thereby determining a transmission frequency control pattern that would maximize the transmission efficiency.

In another embodiment, the control section estimates whether the transmission efficiency increases or decreases as the transmission frequency rises or falls with respect to at least one value of the electric power to transmit and determines a transmission frequency control pattern based on the result of the estimation.

In another embodiment, the two antennas have a resonant frequency adjustment function to change at least one of fs and fp, and the control section changes the fs/fp value after the wireless electric power transmission apparatus has been installed.

In another embodiment, after the wireless electric power transmission apparatus has been installed, the control section transmits electric power wirelessly with fs/fp set to multiple different values, measures transmission efficiency, and then determines an fs/fp value for a normal operation based on the transmission efficiency.

In another aspect, a power transmitting device for use in the wireless electric power transmission apparatus disclosed herein includes one of the two antennas configured to transmit RF power, and an oscillator that is connected to the antenna.

In another aspect, a power receiving device for use in the wireless electric power transmission apparatus disclosed herein includes one of the two antennas configured to receive RF power.

In another aspect, a controller for use in the wireless electric power transmission apparatus disclosed herein is configured to control the resonant frequency according to the magnitude of the electric power to be transmitted from one of the two antennas to the other.

Hereinafter, embodiments of the present disclosure will be described more concretely.

As shown in FIG. 1, a wireless electric power transmission apparatus as an embodiment of the present disclosure includes two antennas (namely, a power transmitting antenna 107 and a power receiving antenna 109), from one of which RF power can be transmitted to the other by a non-contact method via resonant magnetic coupling, and an oscillator 103 which is connected to the power transmitting antenna 107 on the RF power transmitting end. One of the power transmitting antenna 107 and the power receiving antenna 109 is a series resonant circuit, of which the resonant frequency is fs, and the other is a parallel resonant circuit, of which the resonant frequency is fp. The power receiving antenna 109 is not in contact with the power transmitting antenna 107 but is located at a distance of about several millimeters to about several ten centimeters from the power transmitting antenna 107, for example.

This wireless electric power transmission apparatus further includes a control section (which will be referred to herein as a "transmission frequency control section") 100 which controls the frequency of the RF power (i.e., the transmission frequency) to be transmitted from one of the two antennas 107 and 109 to the other. The transmission frequency control section 100 is configured to adjust the transmission frequency according to the magnitude of the RF power (which will be referred to herein as "electric power to transmit") to be transmitted from one of the two antennas 107 and 109 to the other. The transmission frequency may be set to fall within the range of 50 Hz to 300 GHz. The transmission frequency suitably falls within the range of 20 kHz to 10 GHz, more suitably within the range of 20 kHz to 20 MHz, and even more suitably within the range of 20 kHz to 1 MHz. In one embodiment, the transmission frequency is set to be 6.78 MHz.

The oscillator 103 receives DC or AC energy (electric power) that is supplied from a power supply (not shown), and performs frequency conversion (which may be either DC/RF conversion or AC/RF conversion) on the supplied energy, thereby turning it into RF energy with the transmission frequency. The oscillator 103 is connected to the transmission frequency control section 100 and gets the transmission frequency changed by the transmission frequency control section 100. The RF energy output from the oscillator 103 is supplied to the power transmitting antenna 107. In transmitting the electric power, the power transmitting antenna 107 and the power receiving antenna 109 are magnetically coupled together via a resonant magnetic field that is produced by their resonators in the surrounding space. The output section of the power receiving antenna 109 is connected to a load. Optionally, a frequency converter may be connected to the output section of the power receiving antenna 109.

In the wireless electric power transmission apparatus according to this embodiment of the present disclosure, the "antenna" is not an ordinary antenna for transmitting or receiving an electromagnetic field radiated but an element for transferring energy from one of two objects to the other, and vice versa, by using a coupling phenomenon that has been produced by the evanescent tail of the magnetic field of the resonator. According to such a wireless electric power transmission technique that uses the resonant magnetic field, energy loss (radiation loss), which would otherwise be caused when an electromagnetic wave is transferred to a distant location, will not be caused, and therefore, the electric power can be transmitted with very high efficiency. Such an energy transfer technique that uses the coupling phenomenon of a resonant electromagnetic field (i.e., a near field) will cause much less loss than a known wireless electric power transmission that uses the Faraday's law of electromagnetic induction. Rather, energy can be transmitted efficiently between two resonators (or antennas), which have an interval of as long as several meters between them.

To carry out a wireless electric power transmission based on such a principle, coupling needs to be produced between two resonant antennas. fs and/or fp do not have to be exactly equal to the transmission frequency. In order to transfer energy highly efficiently via the coupling between the resonators, in an embodiment of the present disclosure, fs is set to be smaller than fp and the transmission frequency is changed according to the electric power to transmit.

Figure 2:
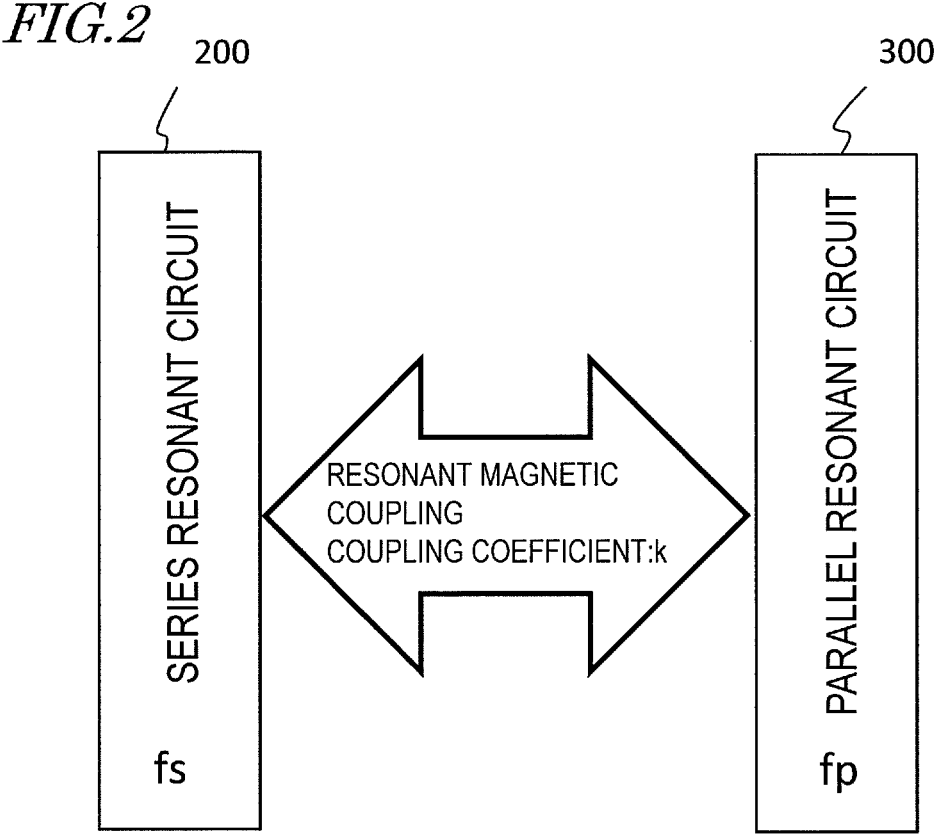
FIG. 2 schematically illustrates how two resonant circuits are coupled together in a wireless electric power transmission apparatus as an embodiment of the present disclosure.

FIG. 2 schematically illustrates how resonant magnetic coupling is produced at a coupling coefficient k between a series resonant circuit 200 with a resonant frequency fs and a parallel resonant circuit 300 with a resonant frequency fp.

In general, it is known that when two resonators that have their own resonant frequencies are electrically coupled together, those resonant frequencies will change. Even if the resonant frequencies of the two resonators are the same, the resonant frequency of the pair of resonators splits into two frequencies as a result of the coupling. Of the two resonant frequencies of the pair of resonators that are coupled together, the higher one will be referred to herein as an "even-mode resonant frequency fH" and the lower one as an "odd-mode resonant frequency fL", respectively. In this case, the coupling coefficient k between the resonators is represented by the following Equation (1):

$$k=(fH^2-fL^2)\div(fH^2+fL^2) \quad (1)$$

In this case, the stronger the degree of coupling, the greater the k value and the bigger the difference between the two resonant frequencies that have split. In an embodiment of the present disclosure, k is set to be a relatively small value, e.g., within the range 0<k≤0.5, more suitably within the range 0.1≤k≤0.5. The k value could be greater than 0.5. However, by setting the k value to be equal to or smaller than 0.5, various effects unique to the resonant magnetic coupling method, including an increased distance between the power transmitting and receiving antennas and asymmetry in size between the power transmitting and receiving antennas, can be achieved significantly.

Figure 3A:
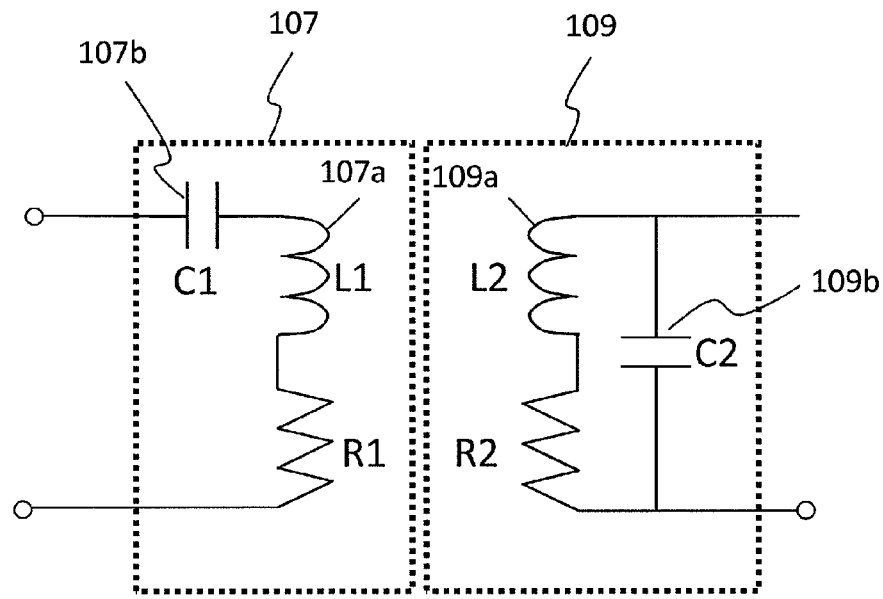
FIG. 3A illustrates an exemplary equivalent circuit for a pair of antennas for use in a wireless electric power transmission apparatus as an embodiment of the present disclosure.
Figure 3B:
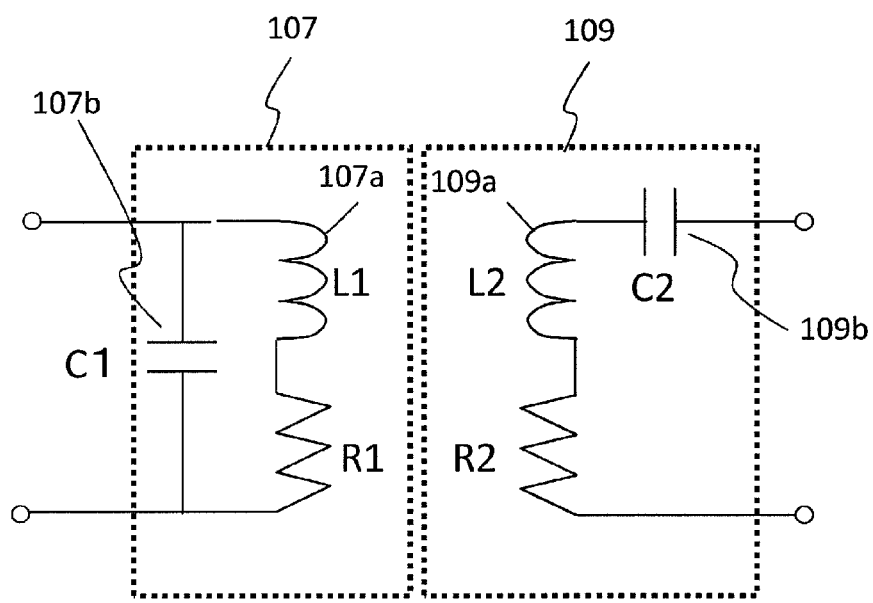
FIG. 3B illustrates another exemplary equivalent circuit for a pair of antennas for use in a wireless electric power transmission apparatus as an embodiment of the present disclosure.

FIG. 3A is an equivalent circuit diagram illustrating a configuration in which the power transmitting antenna 107 is implemented as a series resonant circuit and the power receiving antenna 109 is implemented as a parallel resonant circuit. In the exemplary configuration shown in FIG. 3A, the power transmitting antenna 107 is a series resonant circuit in which a first inductor 107a and a first capacitor 107b are connected together in series, while the power receiving antenna 109 is a parallel resonant circuit in which a second inductor 109a and a second capacitor 109b are connected together in parallel. The series resonant circuit of the power transmitting antenna 107 has a parasitic resistance component R1 and the parallel resonant circuit of the power receiving antenna 109 has a parasitic resistance component R2. In an embodiment of a wireless electric power transmission apparatus according to the present disclosure, the power transmitting antenna 107 and the power receiving antenna 109 are implemented as an asymmetric combination consisting of a series resonant circuit and a parallel resonant circuit. In an alternative embodiment of the present disclosure, the power transmitting antenna 107 may be implemented as a parallel resonant circuit and the power receiving antenna 109 may be implemented as a series resonant circuit as shown in FIG. 3B. By setting the k value to be equal to or smaller than 0.5 and by implementing the power transmitting antenna and the power receiving antenna as a series resonant circuit and a parallel resonant circuit, respectively, the effect of increasing the voltage received after the electric power has been transmitted can be achieved significantly. On the other hand, by setting the k value to be equal to or smaller than 0.5 and by implementing the power transmitting antenna and the power receiving antenna as a parallel resonant circuit and a series resonant circuit, respectively, the effect of decreasing the voltage received after the electric power has been transmitted can also be achieved significantly.

Figure 4A:
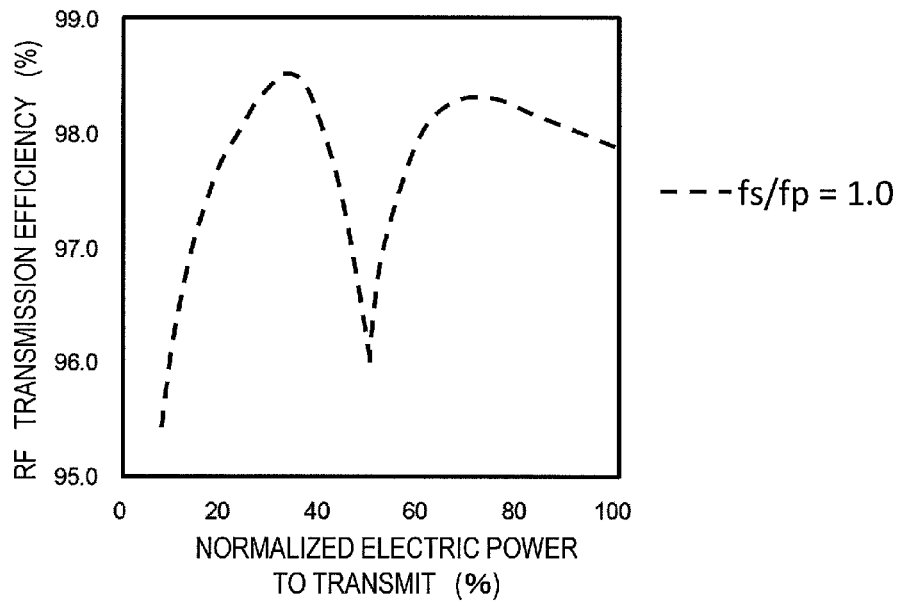
FIG. 4A is a graph showing how the transmission efficiency changes with the (normalized) electric power to transmit when fs/fp=1.0.

In this description, the ratio fs/fp of the resonant frequency fs of a series resonant circuit to the resonant frequency fp of a parallel resonant circuit will be referred to herein as a "resonant frequency ratio". The present inventors discovered that when the resonant frequency ratio fs/fp was set to be equal to 1.0, the transmission efficiency decreased with the electric power to transmit, which is a problem. FIG. 4A is a graph illustrating such a problem. That is to say, this graph shows how the transmission efficiency changes with the electric power to transmit in a situation where fs/fp=1.0. In the graph shown in FIG. 4A, the abscissa represents the electric power to transmit that is normalized with a certain value of the electric power to transmit (which will be referred to herein as "normalized electric power to transmit" (of which the unit is %)). Although any value may be used for the normalization, the maximum value of the electric power to transmit may be used, for example. In this description, this "normalized electric power to transmit" will be sometimes simply referred to herein as "electric power to transmit". In the example illustrated in FIG. 4A, when the electric power to transmit is approximately 50%, a steep decrease in transmission efficiency is observed. Such a steep drop in transmission efficiency will be referred to herein as "Dip". The present inventors discovered that if the fs/fp ratio was set to be a value falling within a particular range that had been determined according to the coupling coefficient k, the magnitude of such a decrease in transmission efficiency due to a variation in the electric power to transmit could be reduced. The present inventors also discovered that when the transmission frequency is varied according to the electric power to transmit, the relation between the electric power to transmit and the transmission frequency should be changed depending on whether a standard value that changes with a coupling coefficient k is greater or smaller than the fs/fp value, thus perfecting our invention.

Figure 4B:
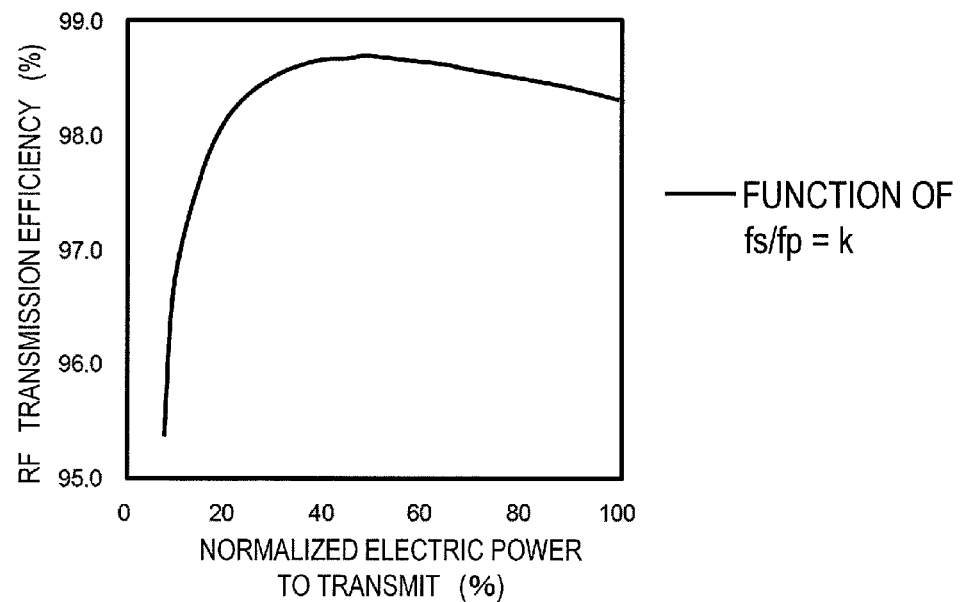
FIG. 4B is a graph showing how the transmission efficiency changes with the (normalized) electric power to transmit in a wireless electric power transmission apparatus in which the fs/fp ratio is set to be the best value (which is a function of k) to be determined by the coupling coefficient k.

FIG. 4B is a graph showing how the transmission efficiency changes with the electric power to transmit in a wireless electric power transmission apparatus in which the fs/fp ratio is set to be the best value that is determined by the coupling coefficient k (which is a function of k). In the example shown in FIG. 4B, the transmission frequency is set to be a constant value irrespective of the electric power to transmit. Comparing the solid curve shown in FIG. 4B to the dashed curve shown in FIG. 4A, it can be seen easily that by setting the fs/fp ratio to be the best value that is determined by the coupling coefficient k, the decrease in transmission efficiency due to a variation in electric power to transmit can be minimized. However, the present inventors also discovered that even if the fs/fp ratio disagreed with the best value that had been determined by the coupling coefficient k (i.e., as a function of k), the transmission frequency could be adjusted according to the electric power to transmit.

Hereinafter, the relation between the fs/fp ratio and the coupling coefficient will be described.

Figure 5:
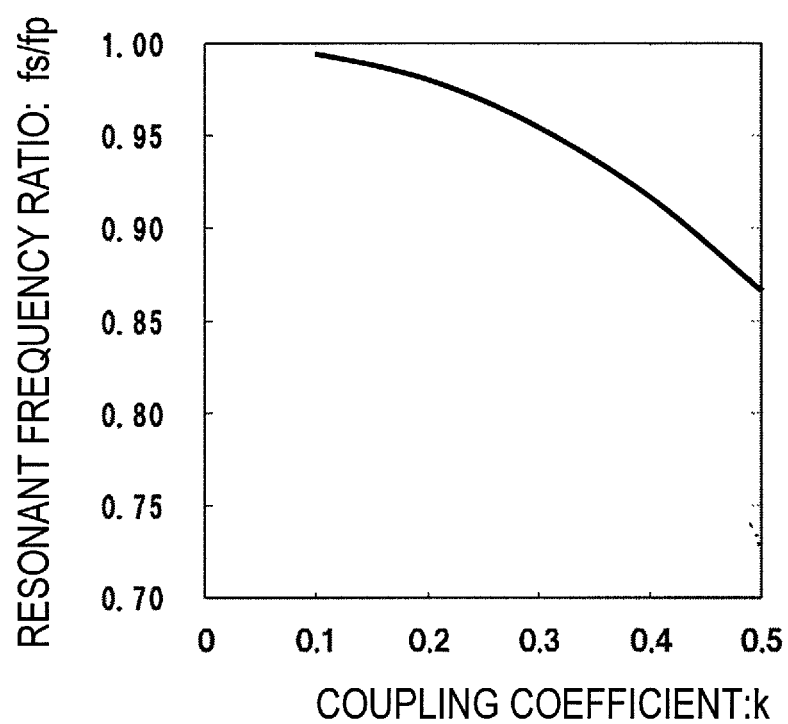
FIG. 5 is a graph showing how the best fs/fp ratio changes with the coupling coefficient k.

First of all, look at FIG. 5, which is a graph showing how the resonant frequency ratio fs/fp (represented by the ordinate) changes with the coupling coefficient k (represented by the abscissa). In FIG. 5, the solid curve represents a quadratic equation given by the following Equation (2):

$$fs/fp = F(k) = -0.6074 \times k^2 + 0.0466 \times k + 0.9955 \quad (2)$$

This Equation (2) represents the best fs/fp ratio when a coupling coefficient k is given. In this case, the fs/fp ratio is called the "best" because if the fs/fp ratio is varied, then the local decrease in transmission efficiency such as the one shown in FIG. 4A can be minimized. It does not mean that even if the fs/fp ratio is the best one, the local decrease in transmission efficiency can be eliminated altogether.

Figure 6:
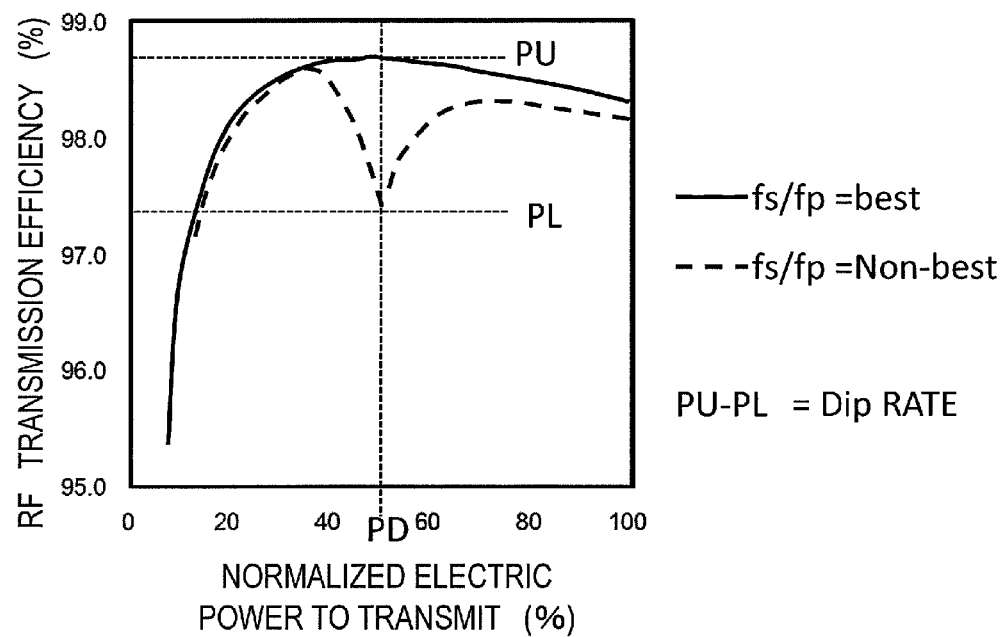
FIG. 6 is a graph showing what the "Dip rate" means.

In this description, in order to estimate the degree of decrease in transmission efficiency, a value called "Dip rate" is introduced. FIG. 6 is a graph showing what the "Dip rate" means. In FIG. 6, the dashed curve shown in FIG. 4A and the solid curve shown in FIG. 4B are both shown. As for the curve with the Dip portion in which the transmission efficiency decreases locally, the electric power to transmit, at which the transmission efficiency becomes a local minimum, is identified by PD and the transmission efficiency at the electric power to transmit PD is identified by PL. On the other hand, as for the curve in which the fs/fp ratio is adjusted to be the best one, the transmission efficiency at the electric power to transmit PD is identified by PU. In this case, the Dip rate is obtained by calculating PU-PL. The best Dip rate is 0% but the actual Dip rate does not always have to be 0%.

In an embodiment of the present disclosure, the relation between the transmission frequency and the electric power to transmit is changed depending on whether the standard value determined by a given k (i.e., which is a function of k) is greater or smaller than fs/fp. A typical example of that standard value is defined by the function F(k) that is represented by the quadratic equation (2). If fs/fp is out of F(k), the Dip rate can still be reduced by appropriately adjusting the transmission frequency according to the electric power to transmit. In this case, the "magnitude of the given k" may refer herein to the "magnitude of k that has been set in advance during a design process" or the "magnitude of k that has been measured directly after the antennas have been installed", or the "magnitude of k that has been estimated by either measuring or monitoring a physical parameter that varies with k after the antennas have been installed".

In the example illustrated in FIG. 1, the transmission frequency control section 100 connected to the oscillator 103 controls the transmission frequency according to the magnitude of the electric power to transmit from one of the two antennas to the other. In this description, the concept of reference frequency f0 is introduced in order to make a variation in transmission frequency more easily understandable. In this case, the frequency f0 is a transmission frequency associated with the maximum electric power to transmit when fs/fp is optimized.

In this embodiment, the curve shown in FIG. 5, i.e., the function F(k) defined by Equation (2), is supposed to represent the standard value that depends on the coupling coefficient k. That is why the transmission frequency control section 100 of this embodiment can change the dependence of the transmission frequency on the electric power to transmit depending on whether the fs/fp value is located over or under the curve shown in FIG. 5. If the fs/fp value is located on the curve shown in FIG. 5, then the transmission frequency may be kept constant irrespective of the electric power to transmit.

In a situation where the fs/fp value is greater than the function F(k), the transmission frequency control section 100 of this embodiment sets the transmission frequency to be a value that falls within a first frequency range, which is higher than the frequency f0, if the electric power to transmit from one of the antennas 107, 109 to the other is greater than a reference value P1 but sets the transmission frequency to be a value that falls within a second frequency range, which is lower than the first frequency range, if the electric power to transmit is smaller than the reference value P1. In this case, the second frequency range is lower than the first frequency range under the electric power condition (or in the electric power range). This reference value P1 is set to be smaller than the maximum electric power Pmax to transmit and is suitably set to fall within the range of 40-80% of the maximum electric power Pmax to transmit. If the electric power to transmit is set to be much smaller than the maximum electric power Pmax to transmit, the transmission efficiency can be kept high by switching the modes of resonant magnetic coupling between the power transmitting and power receiving antennas.

On the other hand, in a situation where the fs/fp value is less than the function F(k), the transmission frequency control section 100 of this embodiment sets the transmission frequency to be a value that falls within a first frequency range, which is higher than the frequency fp, if the electric power to transmit is smaller than a reference value P1 but sets the transmission frequency to be a value that falls within a second frequency range, which is lower than the first frequency range, if the electric power to transmit is greater than the reference value P1.

Figure 7A:
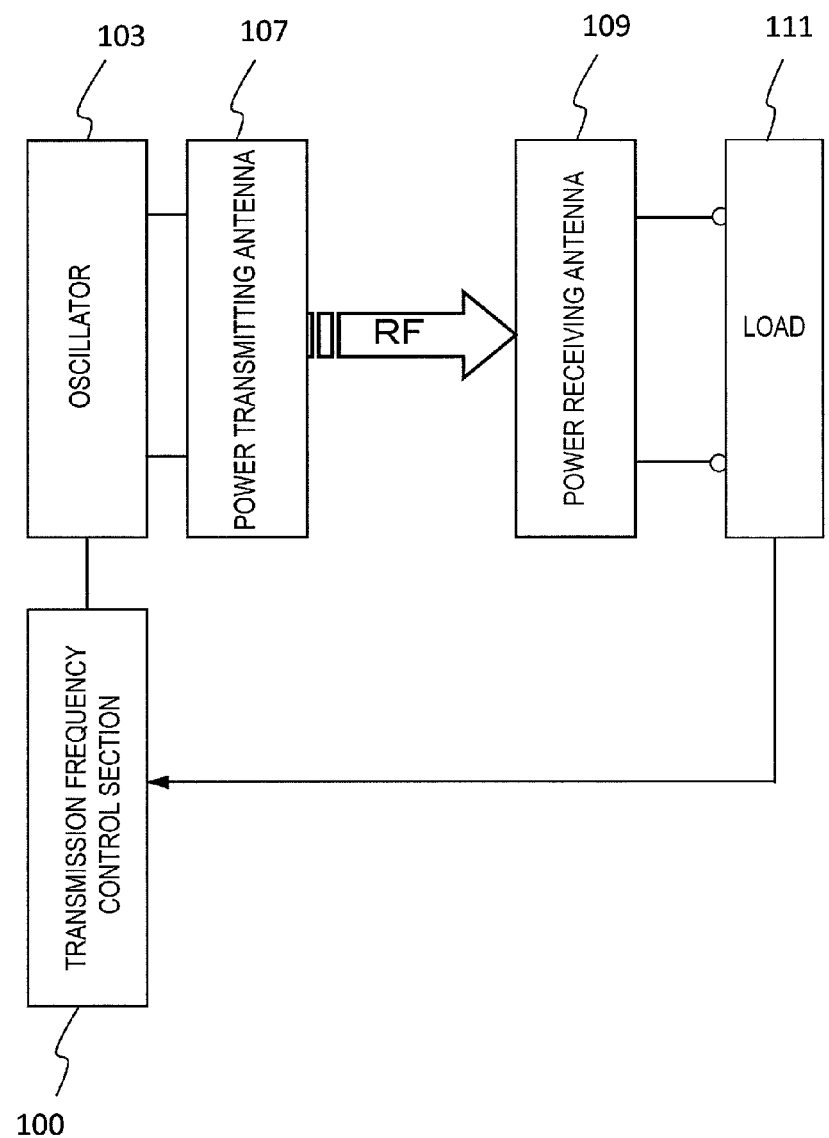
FIG. 7A is a block diagram illustrating an embodiment in which a load 111 and a transmission frequency control section 100 are further connected.

The transmission frequency control section 100 generates a signal to control the oscillation frequency of the oscillator 103 (such as a pulse train with a variable frequency) and supplies that signal to the oscillator 103. In this embodiment, the output of the power receiving antenna 109 is connected to a load 111 as shown in FIG. 7A. Depending on the condition of (such as the power dissipated by) that load 111, the magnitude of the electric power to be transmitted from the power transmitting antenna 107 to the power receiving antenna 109 may vary. In the example illustrated in FIG. 7A, either information or signal indicating the magnitude of the electric power to transmit that is required by the load 111 is supplied from the load 111 to the control section 100. In response, the control section 100 can increase or decrease the oscillation frequency of the oscillator 103. As a result, the transmission frequency is controlled.

Figure 7B:
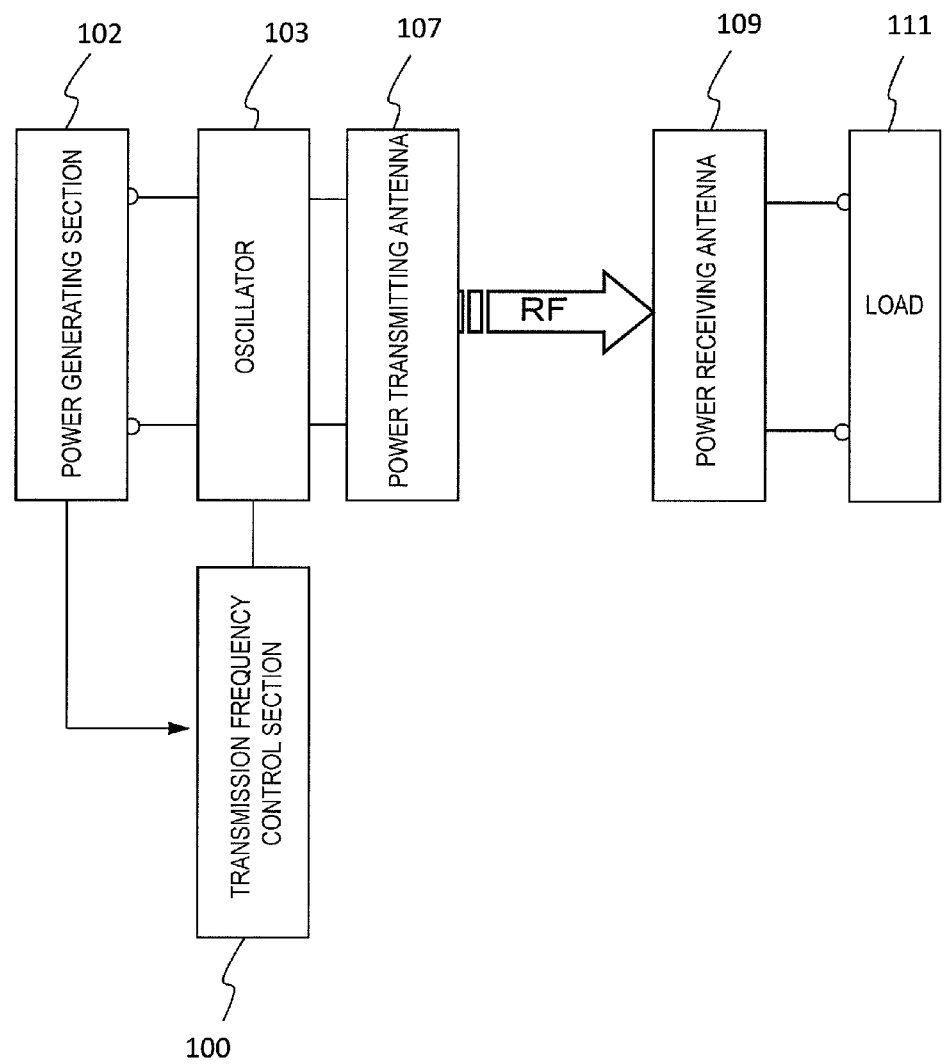
FIG. 7B is a block diagram illustrating an embodiment in which a power generating section 103 and a transmission frequency control section 100 are further connected.

In another embodiment of the present disclosure, the oscillator 103 may be connected to a power generating section 102 as shown in FIG. 7B and the frequency control section 100 can change the oscillation frequency of the oscillator 103 depending on the condition of the power generating section 102. The power generating section 102 includes a power generating module such as a solar cell. The electric power to be supplied from the power generating section 102 to the oscillator 103 may vary depending on the condition of the power generating section 102. For example, the electric power to generate may vary according to the quantity of the sunlight received by the solar cell. In that case, the magnitude of the electric power to be transmitted from the power transmitting antenna 107 to the power receiving antenna 109 may change, too. In the example illustrated in FIG. 7B, either information or signal indicating the magnitude of the electric power to transmit (i.e., the electric power generated by the power generating section 102) is supplied from the power generating section 102 to the control section 100. In response, the transmission frequency control section 100 can increase or decrease the oscillation frequency of the oscillator 103. As a result, the transmission frequency is controlled.

As will be described later, the dependence of the transmission frequency on the electric power to transmit when the transmission frequency is changed according to the electric power to transmit so as to avoid decreasing the transmission efficiency varies according to the fs/fp value and the coupling coefficient k. The relation between the magnitude of the electric power to transmit and the transmission frequency may be determined in advance via experiment, for example, and may be stored in a memory that is provided for either the wireless electric power transmission apparatus or the load. Alternatively, the relation between the magnitude of the electric power to transmit and the transmission frequency may also be determined by the transmission efficiency while electric power is actually being transmitted. In general, the fs/fp value is set to be a predetermined value (designed value) while the power transmitting antenna 107 and the power receiving antenna 109 are being made. However, the actual fs/fp value could be different from the designed value. That is why after the wireless electric power transmission apparatus has been installed, the exact value of fs/fp could be unknown. In that case, after the wireless electric power transmission apparatus has been installed, electric power may be actually transmitted wirelessly and it may be determined what relation the electric power to transmit and the transmission frequency should have in order to decrease the Dip rate sufficiently.

Figure 8A:
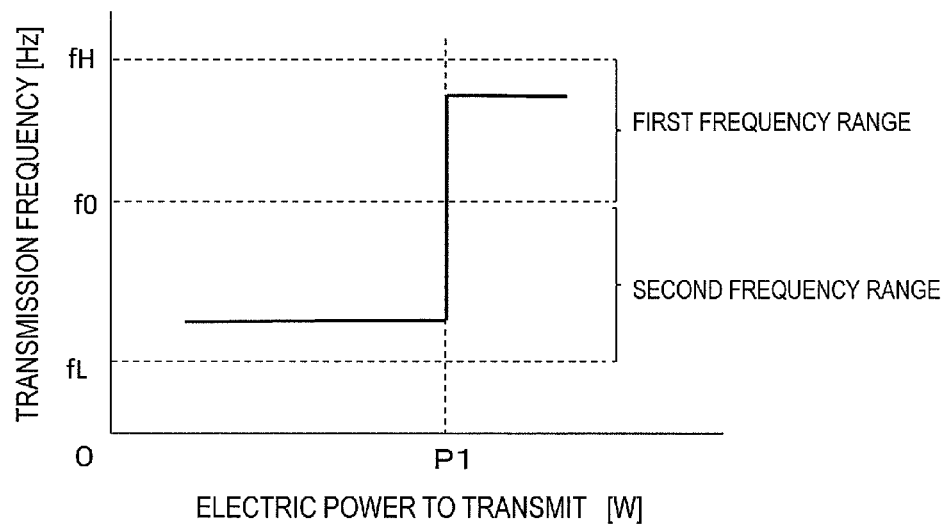
FIG. 8A is a graph showing an exemplary relation between the magnitude of the electric power to transmit and the frequency of the electric power to transmit in an embodiment of the present disclosure.

FIG. 8A is a graph showing an exemplary relation between the electric power to transmit and the frequency in a situation where the fs/fp value is equal to or greater than the standard value that depends on the coupling coefficient k. More specifically, in FIG. 8A, illustrated schematically is an exemplary relation in which the Dip rate can be reduced in a situation where the fs/fp value is greater than the standard value that depends on the coupling coefficient k. In the example shown in FIG. 8A, a frequency falling within the first frequency range is set to be higher than the frequency f0. In this example, the first frequency range is defined to be from over the frequency f0 through the even mode resonant frequency fH, while the second frequency range is defined to be from the odd mode resonant frequency fL through the frequency f0. The even- and odd-mode resonant frequencies fH and fL are just as described above.

If the electric power to transmit has changed from a value that is greater than the reference value P1 into a value that is smaller than the reference value P1, or vice versa, then the control section 100 makes the transmission frequency hop from a value falling within the first frequency range to a value falling within the second frequency range, or vice versa. By making the transmission frequency hop, the control section 100 changes the modes of the resonant magnetic field that couples the two antennas together from the even mode into the odd mode, or vice versa.

Figure 8B:
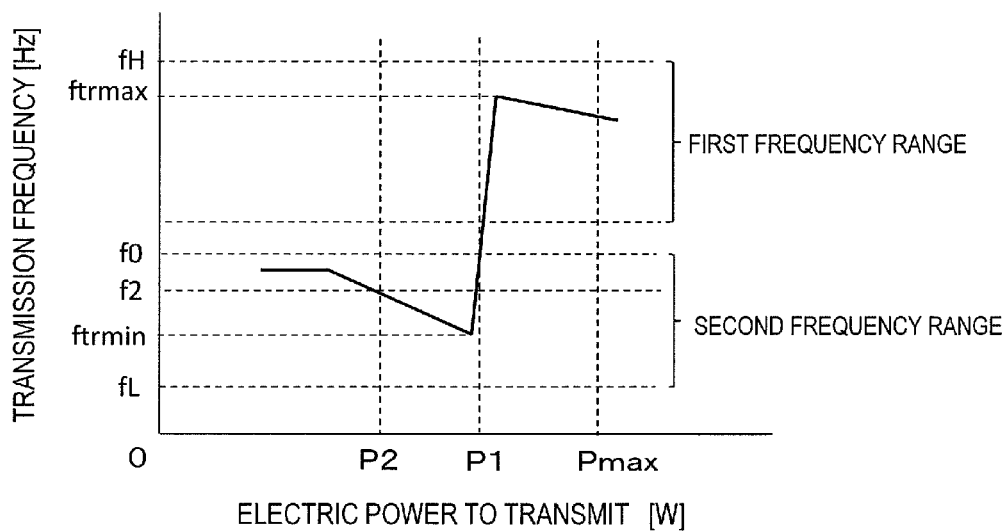
FIG. 8B is a graph showing another exemplary relation between the magnitude of the electric power to transmit and the frequency of the electric power to transmit in an embodiment of the present disclosure.

The relation between the electric power to transmit and the transmission frequency does not have to be as shown in FIG. 8A. FIG. 8B shows an example of a more complex relation. In this example, if the electric power to transmit is between a reference value P1 and a second reference value P2, which is smaller than the reference value P1, the control section 100 sets the transmission frequency to be equal to or smaller than the frequency f2 that is lower than the frequency f0. If the electric power to transmit is smaller than the second reference value P2, the control section 100 sets the transmission frequency to be a value that is higher than the frequency f2. And if the electric power to transmit is sufficiently small (e.g., if the electric power to transmit is 10% or less of the maximum electric power Pmax to transmit, the transmission frequency can be set to be approximately equal to the frequency f0.

The relation between the magnitude of the electric power to transmit and the transmission frequency and the reference values P1 and P2 and other values can be obtained by determining a transmission frequency that will optimize the transmission efficiency under given electric power to transmit. A specific example of the relation between the magnitude of the electric power to transmit and the transmission frequency will be described in detail later. The coupling coefficient k between the two antennas can be kept constant while the electric power is being transmitted.

The relation shown in FIG. 8A or 8B may be adopted particularly when fs/fp is close to one. As described above, if fs/fp is on the curve of Equation (2), there is no need to vary the transmission frequency according to the electric power to transmit. That is why if fs/fp has a value that is close to the curve of Equation (2), the transmission frequency does not need to be changed as shown in FIGS. 8A and 8B.

Figure 9A:
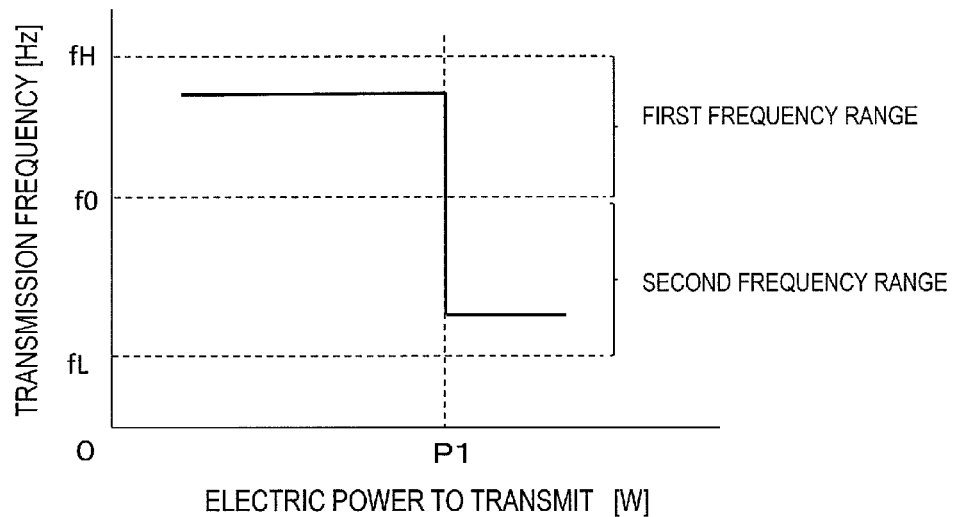
FIG. 9A is a graph showing still another exemplary relation between the magnitude of the electric power to transmit and the frequency of the electric power to transmit in an embodiment of the present disclosure.
Figure 9B:
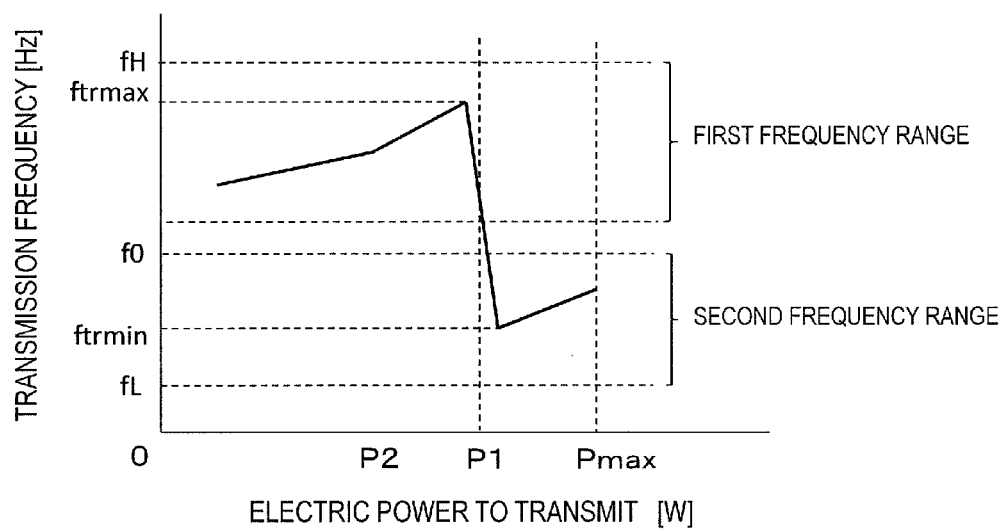
FIG. 9B is a graph showing yet another exemplary relation between the magnitude of the electric power to transmit and the frequency of the electric power to transmit in an embodiment of the present disclosure.

Next, another exemplary relation between the magnitude and frequency of the electric power to transmit will be described. FIG. 9A is a graph showing another exemplary relation between the intensity and frequency of the electric power to transmit in a situation where the fs/fp value is less than the standard value that depends on the coupling coefficient k. The control section 100 makes the transmission frequency hop in a different manner depending on whether the fs/fp value is greater or smaller than the standard value that depends on the coupling coefficient k. In the example shown in FIG. 9A, if the electric power to transmit has changed from a value that is greater than the reference value P1 into a value that is smaller than the reference value P1, the control section 100 raises the transmission frequency from a value falling within the second frequency range to a value falling within the first frequency range. On the other hand, if the electric power to transmit has changed from a value that is smaller than the reference value P1 into a value that is greater than the reference value P1, the control section 100 lowers the transmission frequency from a value falling within the first frequency range to a value falling within the second frequency range. If the fs/fp value is less than the standard value that depends on the coupling coefficient k, the relation between the magnitude of the electric power to transmit and the transmission frequency does not have to be the one shown in FIG. 9A. An example of a more complex relation is shown in FIG. 9B.

The relation between the magnitude of the electric power to transmit and the transmission frequency and the reference values P1 and P2 and other values can be obtained by determining a transmission frequency that will optimize the transmission efficiency under given electric power to transmit. A specific example of the relation between the magnitude of the electric power to transmit and the transmission frequency will be described in detail later. The coupling coefficient k between the two antennas can be kept constant while the electric power is being transmitted.

Naturally, a wireless electric power transmission apparatus should maintain high transmission efficiency under such an operating condition that turns the power P to transmit into a maximum one Pmax. However, the efficiency should also be kept high even under such a transmission condition for transmitting a reduced power. Furthermore, no matter whether the power to transmit satisfies P=Pmax or P≠Pmax, it is possible that a constant voltage operation be always performed. That is why the following relations need to be satisfied between the input and output impedances Zin (P=Pmax), Zout (P=Pmax) when P=Pmax and the input and output impedances Zin and Zout when an arbitrary power P is transmitted:

$$Zin = Zin(P=Pmax) \times (Pmax \div P) \quad (3)$$

$$Zout = Zout(P=Pmax) \times (Pmax \div P) \quad (4)$$

That is to say, while a constant voltage operation is performed, the input and output impedances change inversely proportionally to the electric power to transmit. Under this condition, high transmission efficiency can be maintained in a broad transmission power range. The transmission frequency ftr of a wireless electric power transmission apparatus according to an embodiment of the present disclosure is controlled so as to change, according to the magnitude of electric power to transmit, within a range that is higher than the frequency fL but lower than the frequency fH.

It should be noted that such a phenomenon happens only when the power transmitting and power receiving antennas are implemented as a combination of asymmetric resonant circuit structures such as a series resonant circuit and a parallel resonant circuit. That is to say, the effects of an embodiment of the present disclosure cannot be achieved if the power transmitting and power receiving antennas are implemented as a pair of series resonant circuits or a pair of parallel resonant circuits. Likewise, if the power transmitting and power receiving antennas both have a circuit configuration that is supplied with energy from an external circuit based on the principle of electromagnetic induction (which will be referred to herein as "circuits electromagnetic induction power supply type"), the effects of an embodiment of the present disclosure cannot be achieved, either. Furthermore, even if the power transmitting and power receiving antennas are implemented as a pair of resonators in a hybrid combination such as a series resonant circuit and an electromagnetic induction power supply type circuit or a parallel resonant circuit and an electromagnetic induction power supply type circuit, the effects of an embodiment of the present disclosure cannot be achieved, either.

The P1 value may be set to be a power value that is approximately 40-80% as high as Pmax. However, the P1 value does not have to fall within this range but may also be out of the range depending on the situation.

The transmission frequency can be easily varied and controlled by adjusting the oscillation frequency of the oscillator 103.

It is recommended that while electric power is being transmitted, the coupling coefficient k between the power transmitting and power receiving antennas be kept substantially constant. This is because if the coupling coefficient k varied significantly while electric power is being transmitted, it would be difficult to achieve the constant-voltage operation with high efficiency.

As the oscillator 103, a class D, E or F amplifier that would realize high efficiency and low distortion may be used. Or a Doherty amplifier could also be used. Optionally, a sinusoidal wave may be produced with high efficiency by arranging a low-pass filter or a band-pass filter after a switching element (such as an inverter circuit) that generates an output signal with a distortion component. In that case, the wireless transmission section may also function as a band-pass filter. The oscillator 103 may even be a frequency converter that receives an AC input and delivers an output with a high frequency. In any case, the power that has been supplied to the oscillator is converted into RF energy. That RF energy is transmitted wirelessly through the space by the wireless transmission section and then output through the output terminal.

To reduce multiple reflection of the RF energy between the circuit blocks and to improve the overall transmission efficiency, when the output terminal of the power receiving antenna 109 is connected to a load, the output impedance Zoc of the RF energy of the oscillator 103 may be matched to the input impedance Zic of the power transmitting antenna 107. Likewise, when the oscillator 103 is connected to the power transmitting antenna 107, the output impedance Zout of the power receiving antenna may be matched to the resistance value R of the connected load.

In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

According to this embodiment, the efficiency of the wireless electric power transmission depends on the gap between the power transmitting and power receiving antennas 107 and 109 (which will be referred to herein as an "antenna-to-antenna gap") and on the magnitude of loss caused by circuit components that form the power transmitting and power receiving antennas 107 and 109. In this description, the "antenna-to-antenna gap" substantially means the gap between the two inductors 107a and 109a. The antenna-to-antenna gap can be estimated based on the feature size of the areas occupied by those antennas.

Figure 10:
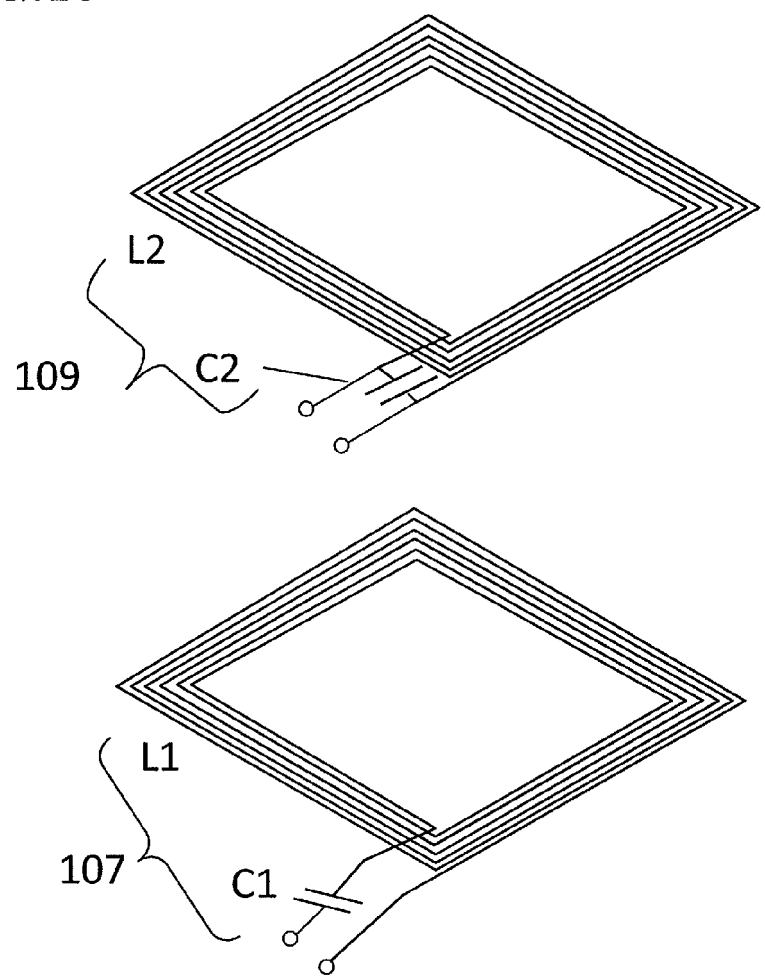
FIG. 10 is a perspective view illustrating exemplary configurations for a power transmitting antenna and a power receiving antenna.

In one embodiment, the first and second inductors 107a and 109a both have the same planar pattern as can be seen from the schematic perspective view shown in FIG. 10. The planar patterns of these inductors may be selected arbitrarily. That is to say, the inductors do not always have to be square or circular ones but may also be rectangular or elliptical ones as well. In this description, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides.

In this embodiment, the first and second inductors 107a and 109a have a spiral structure, of which the numbers of turns are N1 and N2, respectively, where N1>1 and N2>1. However, the first and second inductors 107a and 109a may also have a loop structure with a number of turns of one. These inductors 107a and 109a do not have to be made of a single-layer conductor pattern but may also be a series connection of multiple conductor patterns that have been stacked one upon the other.

The first and second inductors 107a and 109a are suitably made of copper, silver or any other conductor with good electrical conductivity. As RF current with RF energy flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, electric power can be transmitted with even higher efficiency.

To cut down the manufacturing cost, the wiring may be formed at a time by ink printing technique. If necessary, a magnetic body may be arranged near the first and/or second inductor(s) 107a, 109a. However, it is possible that inductors with an air-core spiral structure, which can set the coupling coefficient between the inductors 107a and 109a to be a moderate value, be used.

As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107b and 109b. If the first and second capacitors 107b and 109b are implemented as MIM capacitors, a low-loss capacitor circuit can be formed by known semiconductor device processing or multilevel circuit board process.

Although it depends on the transmission efficiency of antenna-to-antenna electric power transmission as required by the system and the value of the coupling coefficient k, the Q factors of the resonators that are used as the power transmitting and power receiving antennas 107 and 109 should be at least 100, and are suitably set to be 200 or more, more suitably 500 or more, and even more suitably 1000 or more. To achieve such high Q factors, it is effective to adopt Litz wires as described above.

In the embodiment described above, it is determined by comparing the standard value defined by the function F(k) of Equation (2) to fs/fp whether the transmission frequency needs to be changed as shown in FIG. 8A or as shown in FIG. 9A. However, the standard value that is a function of k does not have to be represented by Equation (2). Hereinafter, this respect will be described.

First of all, if the transmission frequency is kept constant irrespective of the electric power to transmit as described above, the closer to the standard value defined by the quadratic Equation (2) the fs/fp value gets, the more significantly the Dip rate can be reduced. If there is only a slight difference between the fs/fp value and the standard value, this Dip rate can be reduced to a sufficiently low level. For that reason, the modes of the variation in transmission frequency may be classified by a function that is similar to Equation (2).

Figure 11:
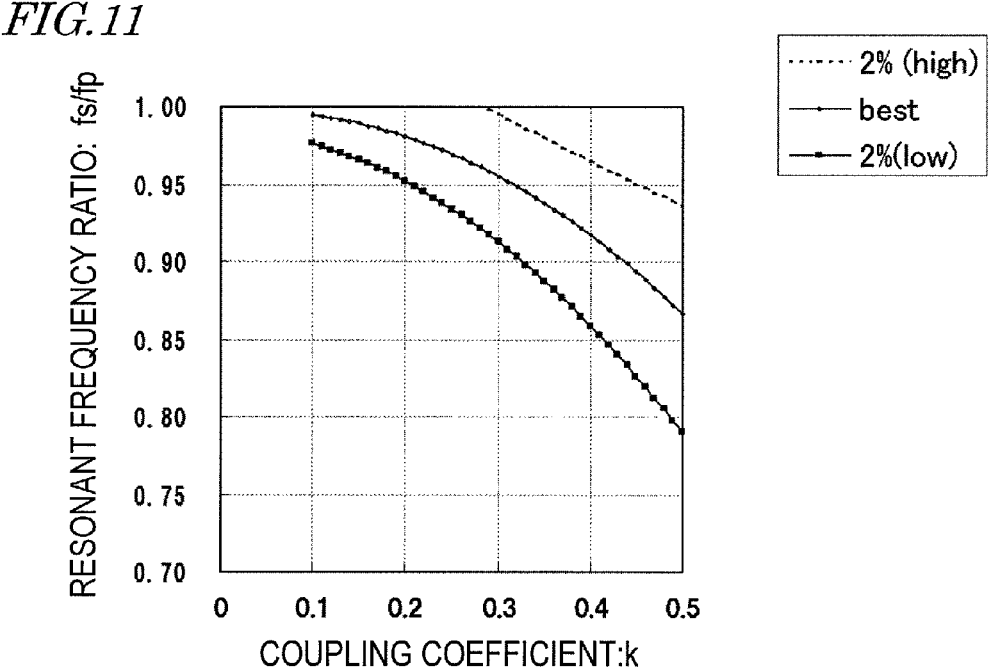
FIG. 11 is a graph showing curves that define the upper limit (high) and lower limit (low) of an fs/fp range in which the Dip rate becomes equal to or smaller than 2% and a curve that defines the best value (best).

FIG. 11 is a graph showing curves that define the upper limit (high) and lower limit (low) of an fs/fp range in which the Dip rate becomes equal to or smaller than 2% and a curve that defines the best value (best) in a situation where fs/fp is smaller than one. If fs and fp have been set so as to satisfy the following Inequalities (5a) and (5b), then the Dip rate can be reduced to 2% or less. As a result, electric power can be transmitted at a lower Dip rate than in a known configuration in which fs/fp=1.

If $0.1 \leq k < 0.29$, $$-0.7309 \times k^2 - 0.0269 \times k + 0.9862 \leq fs/fp < 1 \tag{5a}$$

If $0.29 \leq k \leq 0.5$, $$-0.7309 \times k^2 - 0.0269 \times k + 0.9862 \leq fs/fp < 0.08 \times k^2 - 0.357 \times k + 1.0944 \tag{5b}$$

It should be noted that k=0.29 indicates an intersection between the 2% (high) curve shown in FIG. 11 and the fs/fp=1.

Figure 12:
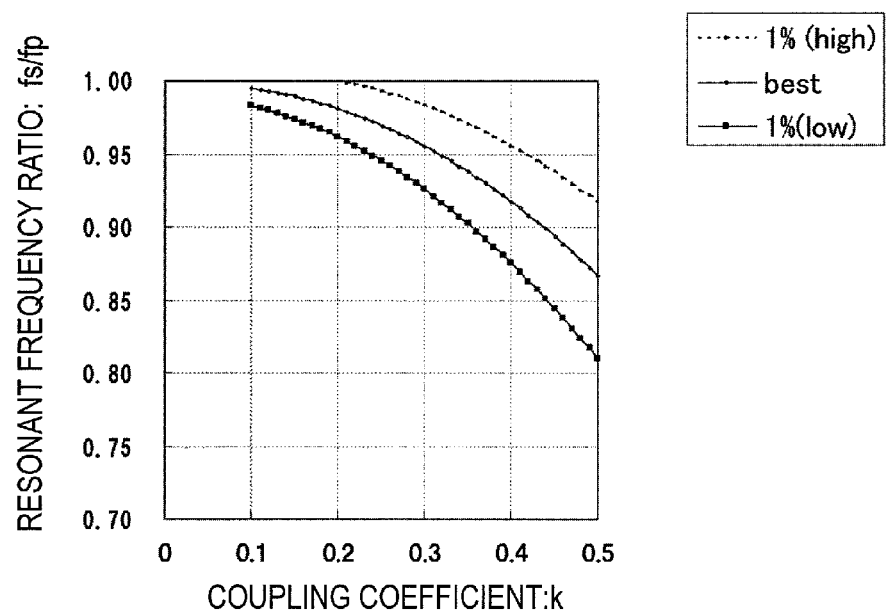
FIG. 12 is a graph showing curves that define the upper limit (high) and lower limit (low) of an fs/fp range in which the Dip rate becomes equal to or smaller than 1% and a curve that defines the best value (best).

FIG. 12 is a graph showing curves that define the upper limit (high) and lower limit (low) of an fs/fp range in which the Dip rate becomes equal to or smaller than 1% and a curve that defines the best value (best) in a situation where fs/fp is smaller than one. In FIG. 12, also shown is a curve (lower limit) that defines a lower limit at or over which the characteristic of the configuration of the present disclosure can be improved about the Dip rate with respect to the configuration in which fs/fp=1. If fs and fp have been set so as to satisfy the following Inequalities (6a) and (6b), then the Dip rate can be reduced to 1% or less. As a result, electric power can be transmitted at a lower Dip rate than in a known configuration in which fs/fp=1.

If $0.1 \leq k < 0.21$, $$-0.7348 \times k^2 + 0.087 \times k + 0.9889 \leq fs/fp < 1 \tag{6a}$$

If $0.21 \leq k \leq 0.5$, $$-0.7348 \times k^2 + 0.087 \times k + 0.9889 \leq fs/fp < -0.5377 \times k^2 + 0.10018 \times k + 1.00106 \tag{6b}$$

It should be noted that k=0.21 indicates an intersection between the 1% (high) curve shown in FIG. 12 and the fs/fp=1.

Figure 13:
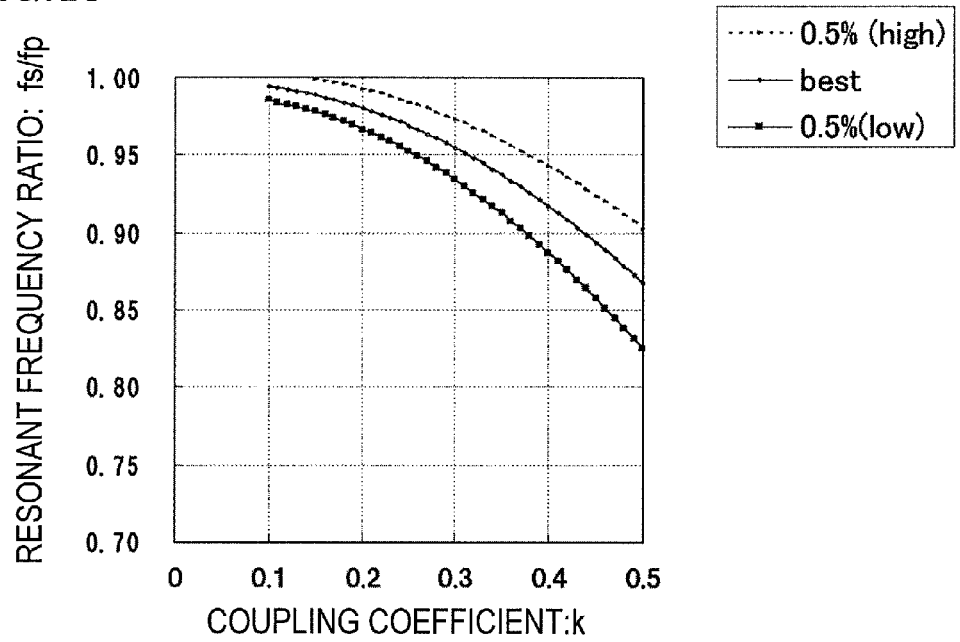
FIG. 13 is a graph showing curves that define the upper limit (high) and lower limit (low) of an fs/fp range in which the Dip rate becomes equal to or smaller than 0.5% and a curve that defines the best value (best).

FIG. 13 is a graph showing curves that define the upper limit (high) and lower limit (low) of an fs/fp range in which the Dip rate becomes equal to or smaller than 0.5% and a curve that defines the best value (best) in a situation where fs/fp is smaller than one. In FIG. 13, also shown is a curve (lower limit) that defines a lower limit at or over which the characteristic of the configuration of the present disclosure can be improved about the Dip rate with respect to the configuration in which fs/fp=1. If fs and fp have been set so as to satisfy the following Inequalities (7a) and (7b), then the Dip rate can be reduced to 0.5% or less.

If $0.1 \leq k < 0.15$, $$-0.7242 \times k^2 + 0.0329 \times k + 0.98945 \leq fs/fp < 1 \tag{7a}$$

If $0.15 \leq k < 0.5$, $$-0.7242 \times k^2 + 0.0329 \times k + 0.9894 \leq fs/fp < -0.5183 \times k^2 + 0.0603 \times k + 1.0016 \tag{7b}$$

It should be noted that k=0.15 indicates an intersection between the 0.5% (high) curve shown in FIG. 13 and the fs/fp=1.

As can be seen, even if fs/fp does not agree with the function F(k) which is represented by the quadratic Equation (2) but if fs/fp is located between the upper and lower limits shown in each of FIGS. 11 to 13, the Dip rate can still be reduced to a relatively small value even when the transmission frequency is constant.

Figure 14:
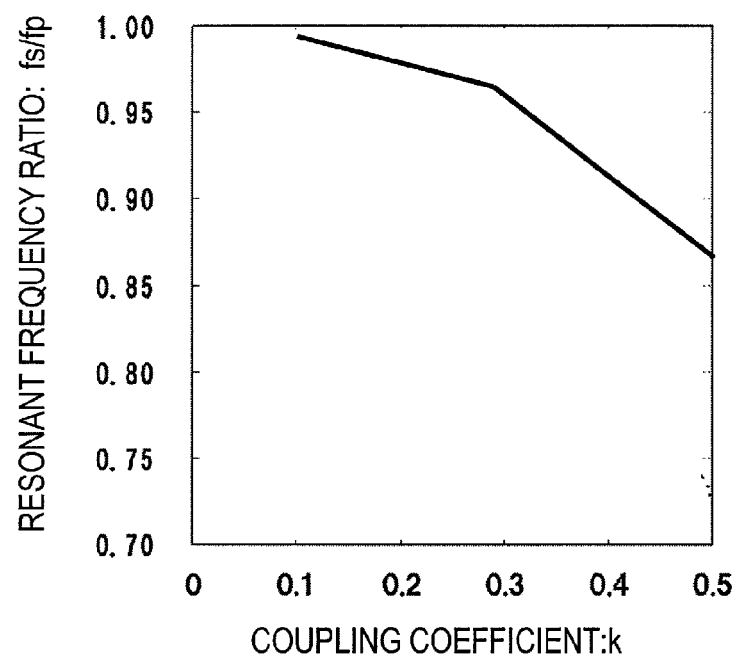
FIG. 14 is a graph showing an exemplary function defining a standard value that depends on the coupling coefficient k.
Figure 15:
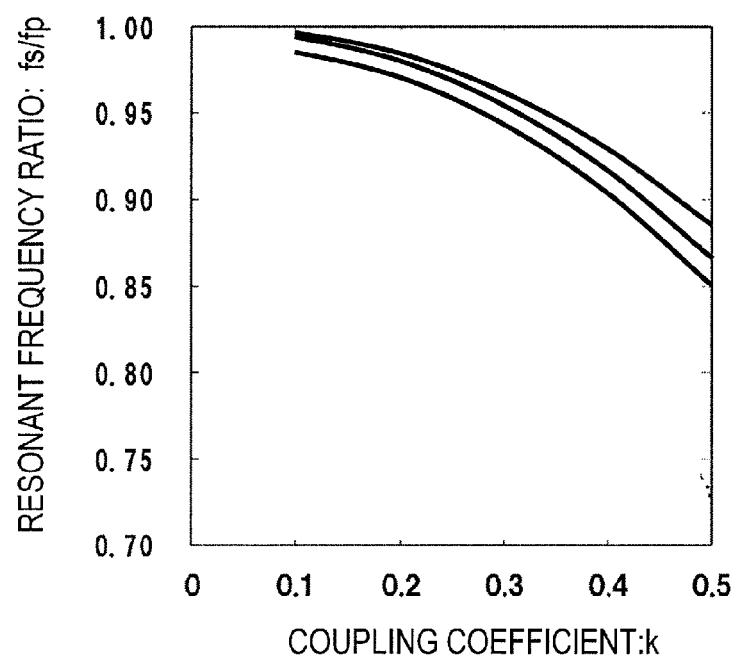
FIG. 15 is a graph showing another exemplary function defining a standard value that depends on the coupling coefficient k.
Figure 16:
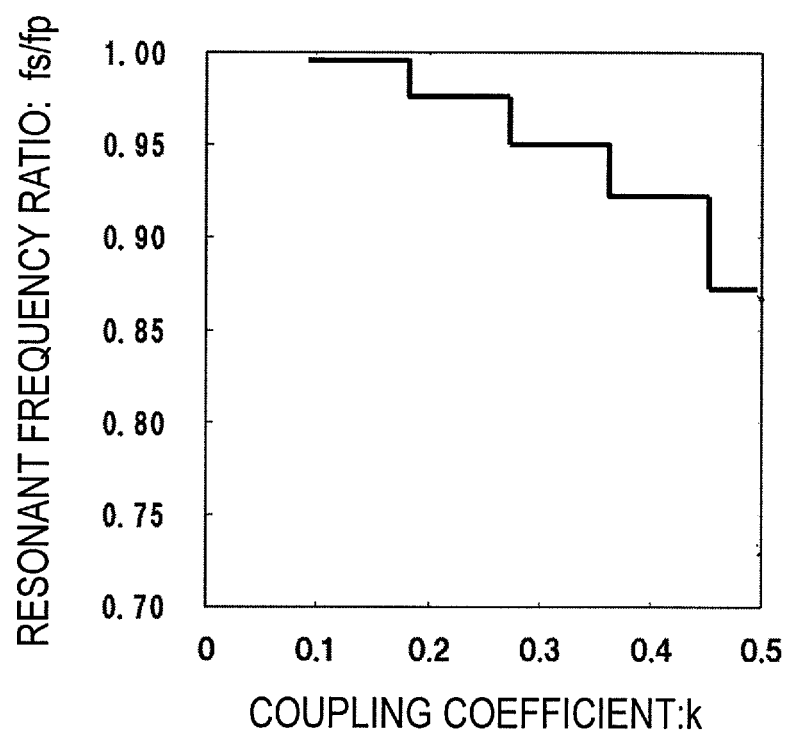
FIG. 16 is a graph showing still another exemplary function defining a standard value that depends on the coupling coefficient k.

For that reason, as long as the function of the coupling coefficient k is located between the upper and lower limits shown in each of FIGS. 11 to 13, the function can be used as a "standard value determined by k". The function defining the standard value may be a function that changes linearly with the coupling coefficient as shown in FIG. 14, or a function that does not exactly match the curve represented by Equation (2) as shown in FIG. 15, or a function that changes stepwise as the coupling coefficient varies as shown in FIG. 16. As shown in these drawings, it is possible that the function defining the standard value be a monotonically decreasing function that decreases monotonically as the coupling coefficient k increases.

Optionally, even after the wireless electric power transmission apparatus has been installed, the resonant frequency of the power transmitting antenna 107 and/or the power receiving antenna 109 may also be varied and adjusted. The fs/fp value can also be adjusted by setting the respective inductance and capacitance values of the antennas 107 and 109 to be various values.

However, the characteristics of circuit components that form the power transmitting antenna 107 and the power receiving antenna 109 may vary from one part to another. That is why the fs/fp value could shift from the designed value. In that case, it may be determined, after the wireless electric power transmission apparatus has been installed, which of the actual value of the coupling coefficient k and the actual fs/fp value is greater than the other.

As described above, if it is not known which of the standard value defined by the coupling coefficient k and the fs/fp value is greater than the other, electric power can be actually transmitted wirelessly while changing the transmission frequency in at least one of the patterns shown in FIGS. 8A and 9A. And while electric power is actually transmitted wirelessly, the transmission efficiency may be measured to find a transmission frequency control pattern that would maximize the transmission efficiency. The transmission efficiency may be calculated based on the ratio of the electric power received by a load to the electric power transmitted by the power generating section. In this manner, even if fs/fp and the coupling coefficient k are unknown, a more appropriate relation between the transmission frequency and the electric power to transmit can also be determined.

Optionally, the "transmission frequency control pattern that would maximize the transmission efficiency" does not have to be determined by operating the wireless electric power transmission apparatus in its entire transmission electric power range but may be determined by operating the apparatus as a test in only a part of the transmission electric power range that includes a predetermined electric power value P1. For example, supposing it is best to change the transmission frequency in the pattern shown in FIG. 8A, if the transmission frequency is decreased while transmitting electric power that is 10% lower than the electric power to transmit P1, it can be confirmed that the transmission efficiency has improved. On the other hand, supposing it is best to change the transmission frequency in the pattern shown in FIG. 9A, if the transmission frequency is decreased while transmitting electric power that is 10% lower than the electric power to transmit P1, it can be confirmed that the transmission efficiency has declined. By operating the apparatus as a test at a different electric power value from the electric power value P1 without using the entire transmission electric power range, the adjustment process can get done even more easily. The electric power value at which the test operation is performed may be set to be lower than the electric power value P1 to cut down the power dissipation, too.

It should be noted that if a variable frequency control function is enabled in setting the resonant frequency of the power transmitting and power receiving antennas, the fs/fp ratio can be adjusted to any arbitrary value.

Figure 17:
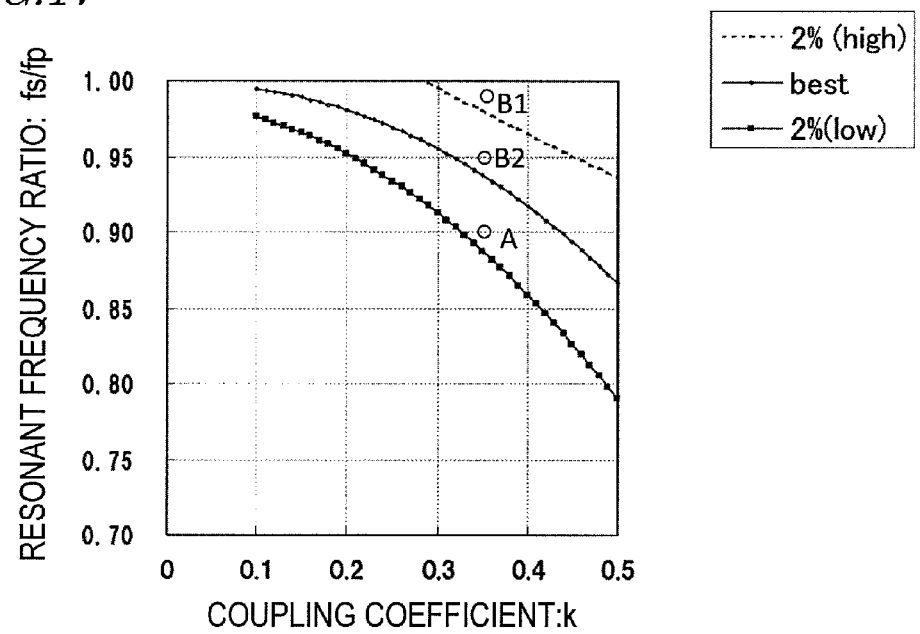
FIG. 17 is a graph showing an exemplary operation in an embodiment in which fs/fp is varied.

Hereinafter, a method for transmitting electric power even more efficiently by adopting such a variable frequency control for the power transmitting and power receiving antennas will be described with reference to FIG. 17.

First of all, in the first process step, the electric power P to transmit is fixed at a certain value P3 in the vicinity of the electric power P1 shown in FIG. 8A or 9A and the transmission frequency is changed to sweep its entire range finely while transmitting the electric power wirelessly as a test. In this manner, the maximum transmission efficiency hmax(P3) at that fixed electric power value P3 is detected.

Next, in the second process step, the resonant frequency ratio fs/fp of the power transmitting and power receiving antennas is changed from its initial value. If the power transmitting antenna or the power receiving antenna is provided with the function of varying and controlling the resonant frequency, the fs/fp value can also be adjusted even after the wireless electric power transmission apparatus has been installed. For example, suppose the fs/fp value that was located at the point A shown in FIG. 17 under the initial condition has shifted to the point B1 by changing the resonant frequency of at least one of the power transmitting and power receiving antennas. In the third process step, with the fs/fp value fixed at that point B1, the same test is carried out as in the first process step described above. As a result, the maximum transmission efficiency hmax(P3) at the electric power value P3 can be detected with the fs/fp value fixed at that point B1.

In the fourth process step, hmax(P3) that has just been obtained at the point B1 in the third process step is compared to hmax(P3) that was obtained at the point A in the first process step, thereby determining which of the two transmission conditions defined at the points A and B1 is preferred to the other.

It should be noted that although only a single electric power value P3 is used in the first and third process steps to detect hmax(P3), multiple electric power values P3 could also be used as well. As for the two points shown in FIG. 17, the condition defined at the point B1 includes a greater Dip than the condition defined at the point A. That is why the condition defined at the point A may be chosen to make the wireless electric power transmission apparatus operate under the condition defined at the point A. Optionally, the fs/fp value may be further shifted to the point B2 in an extra third process step and then hmax(P3) achieved with the fs/fp value at the point B2 may be compared to hmax(P3) achieved with the fs/fp value at the point A in an extra fourth process step. In this manner, it can be determined which of the two transmission conditions defined at the points A and B2 is preferred to the other.

By measuring the maximum transmission efficiencies under multiple conditions with mutually different fs/fp values, a more appropriate fs/fp value can be obtained. As for the three points A, B1 and B2 shown in FIG. 17, Dip becomes the smallest when the fs/fp value is located at the point B2.

It can be determined by reference to the information that has already been obtained in the first process step which of the two transmission frequency control patterns shown in FIGS. 8A and 9A is preferred to the other when the apparatus is operated with the fs/fp value at the point B2.

Finally, in the fifth process step, the electric power to transmit is once fixed at another certain value P4 and the transmission frequency is changed to sweep its entire range finely. In this manner, the transmission efficiency fhmax that will maximize the efficiency at that electric power value P4 is detected. Furthermore, by carrying out a similar test with the electric power to transmit changed from P4, the electric power dependence of fhmax is obtained.

By adopting both the variable frequency control on the power transmitting and power receiving antennas and the transmission frequency control at the same time, the electric power transmission operation can get done more efficiently and more easily.

EXAMPLES

Example 1

Hereinafter, a first specific example of the present disclosure will be described.

The power transmitting and power receiving antennas were designed so that their resonant frequency would both be a value of around 250 kHz. The power transmitting antenna was made by connecting in series together a first inductor with an inductance of 41.08 µH and a first capacitor with a capacitance of 9.69 nF. The power receiving antenna was made by connecting in parallel a second inductor with an inductance of 41.08 µH and a second capacitor. The resonant frequency ratio between the power transmitting and power receiving antennas was achieved by adjusting the capacitance of the second capacitor.

Each of the first and second inductors was a Litz wire that had been formed by arranging multiple sets of 300 copper wires, each having a diameter of 80 µm, in parallel with each other so that those sets were electrically insulated from each other. The two inductors both had a circular shape with a diameter of 12 cm and their number of turns was 20. In such a state, the power transmitting antenna (resonator) had a non-loaded Q factor of 450. The power transmitting and power receiving antennas were arranged so that their front sides faced each other and were parallel to each other. By changing the gap g between their front sides in the range of 1.2 to 5.5 cm, the coupling coefficient was varied within the range of 0.5 to 0.1. The best fs/fp value varies according to each coupling coefficient condition. For that reason, after the coupling coefficient was derived under the gap g condition described above, the respective inductance and capacitance values of the power transmitting and power receiving antennas were finely adjusted so as to achieve the best fs/fp value that had been derived by computer simulations. The inductance could be adjusted by changing the number of turns from its initial value of 20 into a different value or by locally adjusting the gap between adjacent wires. The capacitance could be adjusted by changing the capacitance value of a stacked ceramic capacitor.

Figure 18A:
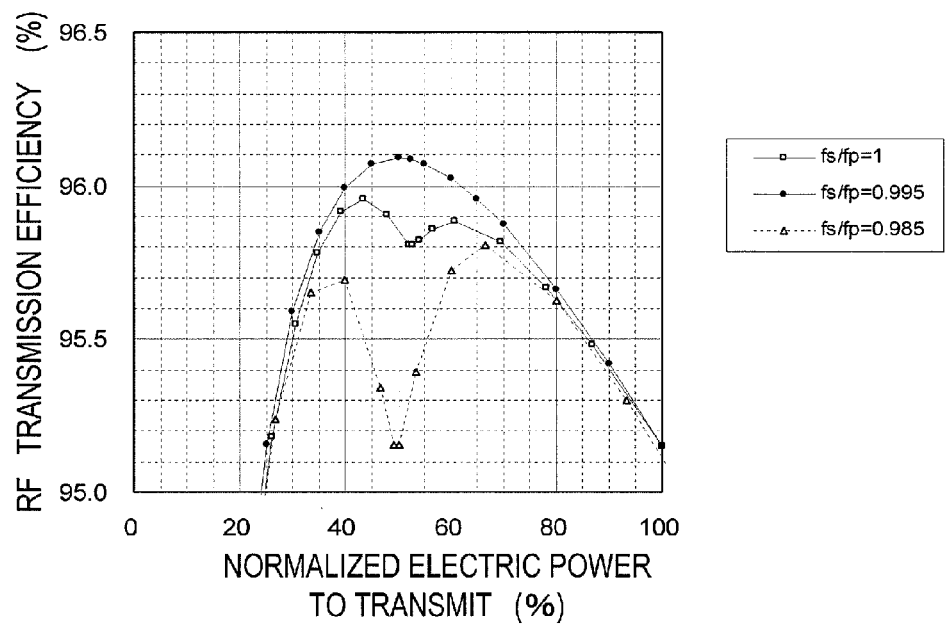
FIG. 18A is a graph showing how the transmission efficiency changes with the electric power to transmit in a situation where k=0.1.
Figure 18B:
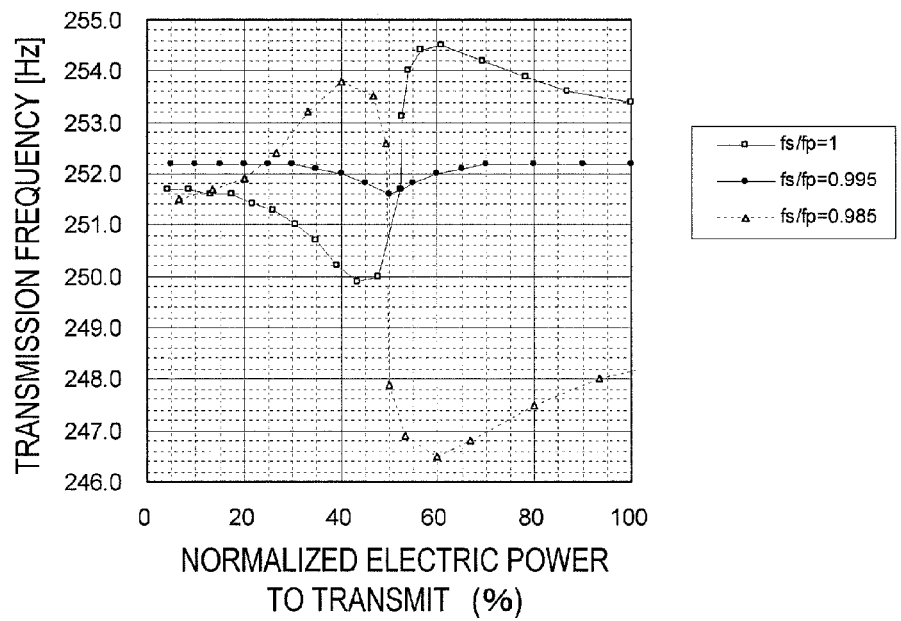
FIG. 18B is a graph showing how the transmission frequency needs to change with the electric power to transmit to achieve the transmission efficiency shown in FIG. 18A.

FIG. 18A is a graph showing how the transmission efficiency changes with the electric power to transmit in Example 1 in a situation where k=0.1. On the other hand, FIG. 18B is a graph showing how the transmission frequency needs to change with the electric power to transmit to achieve the transmission efficiency shown in FIG. 18A. In FIGS. 18A and 18B, the curves plotted with ● show the results that were obtained when fs/fp=0.995, the curves plotted with Δ show the results that were obtained when fs/fp=0.985, and the curves plotted with □ show the results that were obtained when fs/fp=1.0 (reference example). The fs/fp values indicated by the solid circles ● are approximately equal to the reference value represented by the function F(k) of Equation (2). On the other hand, the fs/fp values indicated by the open triangles Δ are smaller than the reference value represented by the function F(k) of Equation (2).

As can be seen from FIG. 18A, if fs/fp=1.0, a local decrease in transmission efficiency was observed in one Dip rate at a transmission power of approximately 50%. If fs/fp=0.995, however, no such Dip was observed. And if fs/fp=0.985, a larger Dip was observed than when fs/fp=1.0. Also, if fs/fp=0.985, the transmission frequency varied as shown in FIG. 18B. The mode of this change has the patterns shown in FIG. 9B. On the other hand, if fs/fp=1.0, the transmission frequency varied as shown in FIG. 18B. The mode of this change has the patterns shown in FIG. 8B. When fs/fp=1, the power transmitting and power receiving antennas had a resonant frequency of 251.7 kHz, the odd-mode resonant frequency fL was 240 kHz, and the even-mode resonant frequency fH was 265.4 kHz. Also, when fs/fp=0.995, the power transmitting antenna had a resonant frequency of 250 kHz, the power receiving antenna had a resonant frequency of 252.5 kHz, the odd-mode resonant frequency fL was 239.9 kHz, and the even-mode resonant frequency fH was 265.2 kHz. Furthermore, when fs/fp=0.985, the power transmitting antenna had a resonant frequency of 247.7 kHz, the power receiving antenna had a resonant frequency of 251.5 kHz, the odd-mode resonant frequency fL was 239.9 kHz, and the even-mode resonant frequency fH was 265.2 kHz.

Figure 19A:
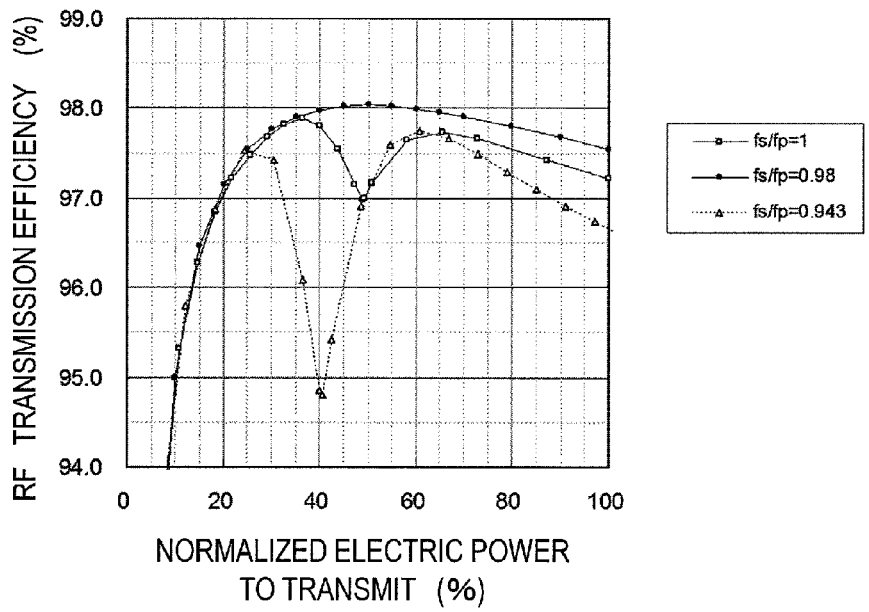
FIG. 19A is a graph showing how the transmission efficiency changes with the electric power to transmit in a situation where k=0.2.
Figure 19B:
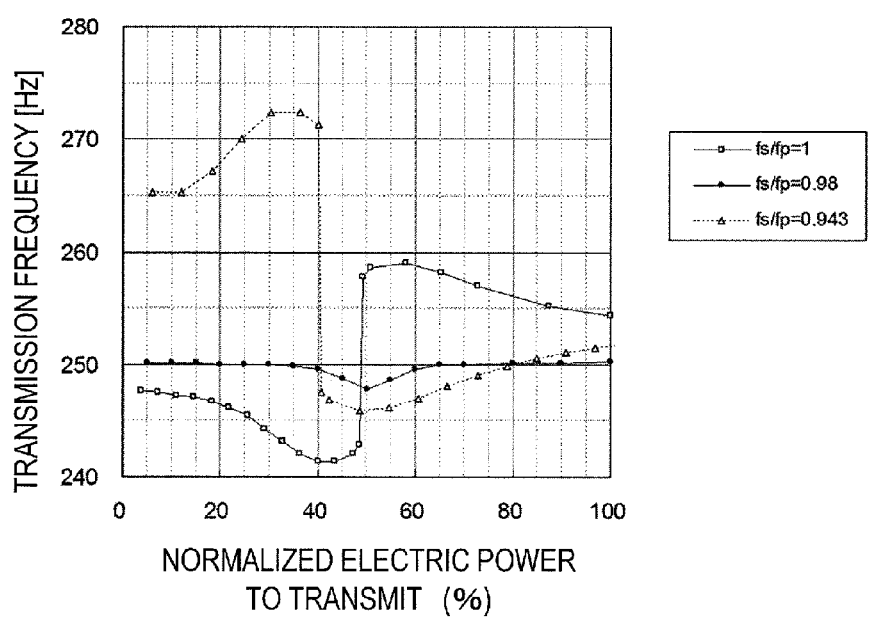
FIG. 19B is a graph showing how the transmission frequency needs to change with the electric power to transmit to achieve the transmission efficiency shown in FIG. 18A.

FIG. 19A is a graph showing how the transmission efficiency changes with the electric power to transmit in Example 1 in a situation where k=0.2. On the other hand, FIG. 19B is a graph showing how the transmission frequency needs to change with the electric power to transmit to achieve the transmission efficiency shown in FIG. 19A. In FIGS. 19A and 19B, the curves plotted with ● show the results that were obtained when fs/fp=0.98, the curves plotted with Δ show the results that were obtained when fs/fp=0.943, and the curves plotted with □ show the results that were obtained when fs/fp=1.0 (reference example). The fs/fp values indicated by the solid circles ● are approximately equal to the reference value represented by the function F(k) of Equation (3). On the other hand, the fs/fp values indicated by the open triangles Δ are smaller than the reference value represented by the function F(k) of Equation (2).

As can be seen from FIG. 19A, if fs/fp=1.0, a local decrease in transmission efficiency was observed in one Dip rate at a transmission power of approximately 50%. If fs/fp=0.98, however, no such Dip was observed. And if fs/fp=0.943, a larger Dip was observed than when fs/fp=1.0. Also, if fs/fp=0.943, the transmission frequency varied as shown in FIG. 19B. The mode of this change has the patterns shown in FIG. 9B. On the other hand, if fs/fp=1.0, the transmission frequency varied as shown in FIG. 19B. The mode of this change has the patterns shown in FIG. 8B. When fs/fp=0.98, the transmission frequency was substantially constant, no matter how much electric power should be transmitted. When fs/fp=1, the power transmitting and power receiving antennas had a resonant frequency of 247.7 kHz, the odd-mode resonant frequency fL was 226 kHz, and the even-mode resonant frequency fH was 276.8 kHz. Also, when fs/fp=0.995, the power transmitting antenna had a resonant frequency of 248.8 kHz, the power receiving antenna had a resonant frequency of 250.1 kHz, the odd-mode resonant frequency fL was 225.9 kHz, and the even-mode resonant frequency fH was 277 kHz. Furthermore, when fs/fp=0.943, the power transmitting antenna had a resonant frequency of 249.0 kHz, the power receiving antenna had a resonant frequency of 264 kHz, the odd-mode resonant frequency fL was 233.1 kHz, and the even-mode resonant frequency fH was 287.8 kHz.

FIG. 20A is a graph showing how the transmission efficiency changes with the electric power to transmit in Example 1 in a situation where k=0.3. On the other hand, FIG. 20B is a graph showing how the transmission frequency needs to change with the electric power to transmit to achieve the transmission efficiency shown in FIG. 20A. In FIGS. 20A and 20B, the curves plotted with ● show the results that were obtained when fs/fp=0.954, the curves plotted with Δ show the results that were obtained when fs/fp=0.894, and the curves plotted with □ show the results that were obtained when fs/fp=1.0 (reference example). The fs/fp values indicated by the solid circles ● are approximately equal to the reference value represented by the function F(k) of Equation (2). On the other hand, the fs/fp values indicated by the open triangles Δ are smaller than the reference value represented by the function F(k) of Equation (2).

As can be seen from FIG. 20A, if fs/fp=1.0, a local decrease in transmission efficiency was observed in one Dip rate at a transmission power of approximately 50%. If fs/fp=0.954, however, no such Dip was observed. And if fs/fp=0.894, a larger Dip was observed than when fs/fp=1.0. Also, if fs/fp=0.894, the transmission frequency varied as shown in FIG. 20B. The mode of this change has the patterns shown in FIG. 9B. On the other hand, if fs/fp=1.0, the transmission frequency varied as shown in FIG. 20B. The mode of this change has the patterns shown in FIG. 8B. When fs/fp=1.0, the transmission frequency was substantially constant, no matter how much electric power should be transmitted. When fs/fp=1, the power transmitting and power receiving antennas had a resonant frequency of 251.7 kHz, the odd-mode resonant frequency fL was 218.8 kHz, and the even-mode resonant frequency fH was 299.3 kHz. Also, when fs/fp=0.954, the power transmitting antenna had a resonant frequency of 244.1 kHz, the power receiving antenna had a resonant frequency of 255.9 kHz, the odd-mode resonant frequency fL was 218.8 kHz, and the even-mode resonant frequency fH was 299.3 kHz. Furthermore, when fs/fp=0.894, the power transmitting antenna had a resonant frequency of 232.2 kHz, the power receiving antenna had a resonant frequency of 259.6 kHz, the odd-mode resonant frequency fL was 213.2 kHz, and the even-mode resonant frequency fH was 296.4 kHz.

Figure 21A:
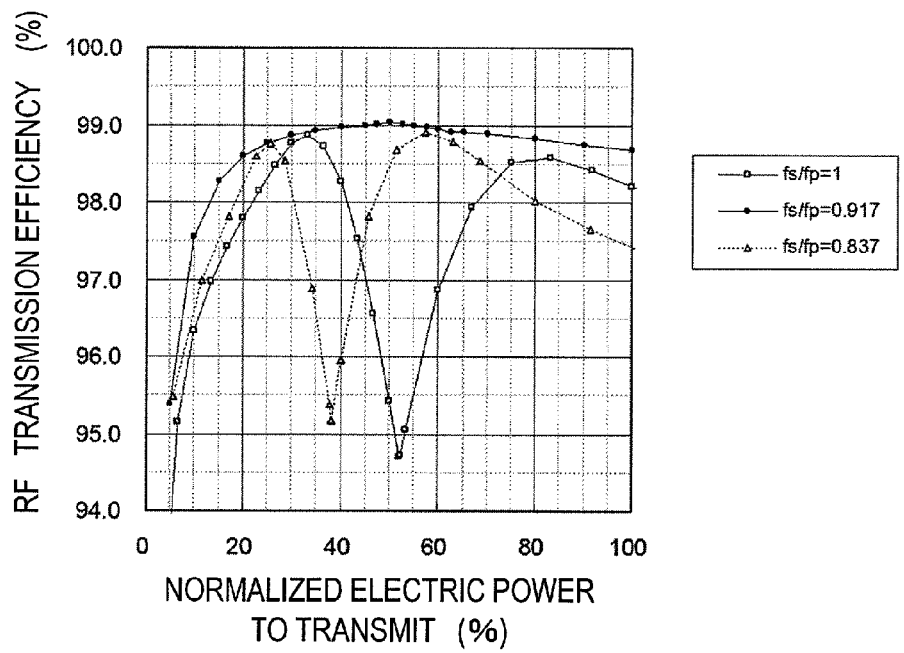
FIG. 21A is a graph showing how the transmission efficiency changes with the electric power to transmit in a situation where k=0.4.
Figure 21B:
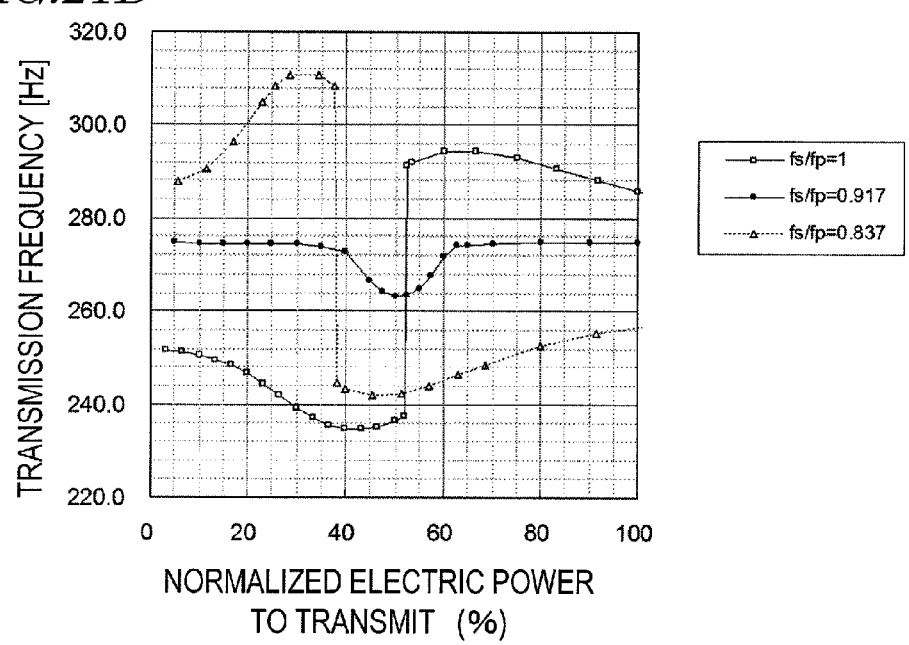
FIG. 21B is a graph showing how the transmission frequency needs to change with the electric power to transmit to achieve the transmission efficiency shown in FIG. 18A.

FIG. 21A is a graph showing how the transmission efficiency changes with the electric power to transmit in Example 1 in a situation where k=0.4. On the other hand, FIG. 21B is a graph showing how the transmission frequency needs to change with the electric power to transmit to achieve the transmission efficiency shown in FIG. 21A. In FIGS. 21A and 21B, the curves plotted with ● show the results that were obtained when fs/fp=0.917, the curves plotted with Δ show the results that were obtained when fs/fp=0.837, and the curves plotted with □ show the results that were obtained when fs/fp=1.0 (reference example). The fs/fp values indicated by the solid circles ● are approximately equal to the reference value represented by the function F(k) of Equation (2). On the other hand, the fs/fp values indicated by the open triangles Δ are smaller than the reference value represented by the function F(k) of Equation (2).

As can be seen from FIG. 21A, if fs/fp=1.0, a local decrease in transmission efficiency was observed in one Dip rate at a transmission power of approximately 50%. If fs/fp=0.917, however, no such Dip was observed. And if fs/fp=0.837, a smaller Dip was observed than when fs/fp=1.0. Also, if fs/fp=0.837, the transmission frequency varied as shown in FIG. 21B. The mode of this change has the patterns shown in FIG. 9B. On the other hand, if fs/fp=1.0, the transmission frequency varied as shown in FIG. 21B. The mode of this change has the patterns shown in FIG. 8B. When fs/fp=0.917, the transmission frequency was substantially constant, no matter how much electric power should be transmitted. When fs/fp=1, the power transmitting and power receiving antennas had a resonant frequency of 251.7 kHz, the odd-mode resonant frequency fL was 212.8 kHz, and the even-mode resonant frequency fH was 325 kHz. Also, when fs/fp=0.917, the power transmitting antenna had a resonant frequency of 252.0 kHz, the power receiving antenna had a resonant frequency of 274.8 kHz, the odd-mode resonant frequency fL was 221.4 kHz, and the even-mode resonant frequency fH was 341.3 kHz. Furthermore, when fs/fp=0.894, the power transmitting antenna had a resonant frequency of 251.1 kHz, the power receiving antenna had a resonant frequency of 280.9 kHz, the odd-mode resonant frequency fL was 224.4 kHz, and the even-mode resonant frequency fH was 343.5 kHz.

Figure 22:
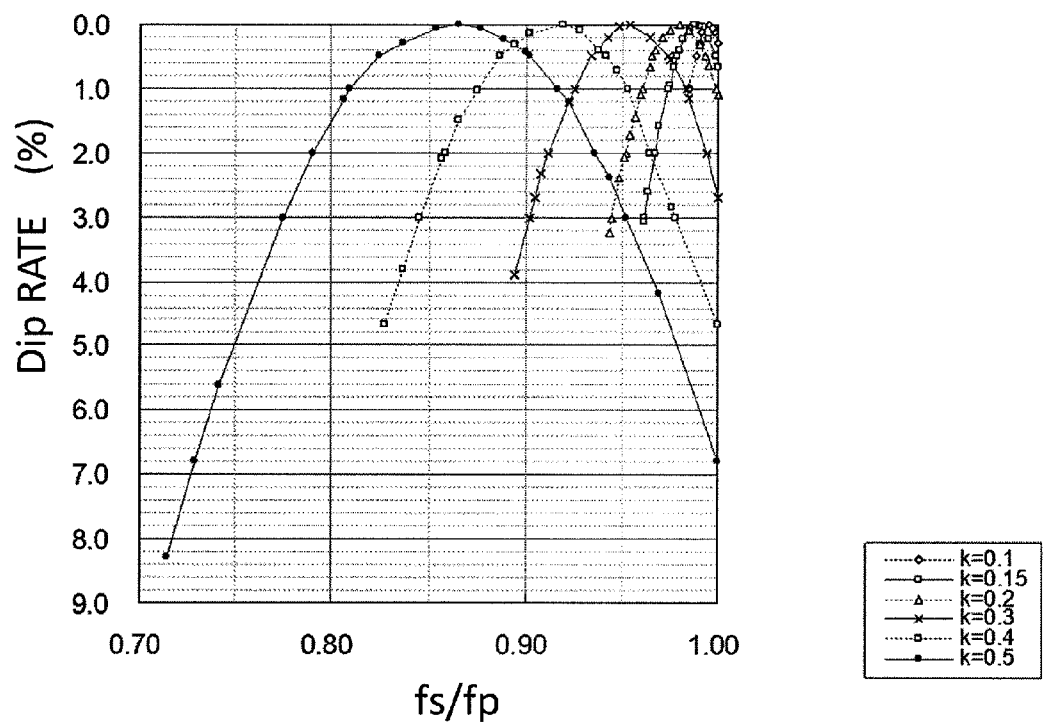
FIG. 22 is a graph showing how the Dip rate changes with the fs/fp ratio.

FIG. 22 is a graph showing how the Dip rate (%) changes with the fs/fp ratio. In this graph, plotted are five curves representing situations where k=0.1, 0.2, 0.3, 0.4 and 0.5, respectively. As can be seen from FIG. 22, even if k changes within the range of 0.1 to 0.5, there is still the best fs/fp value that makes the Dip rate equal to 0%. And if the fs/fp value deviates from that best value, the Dip rate increases.

Figure 23:
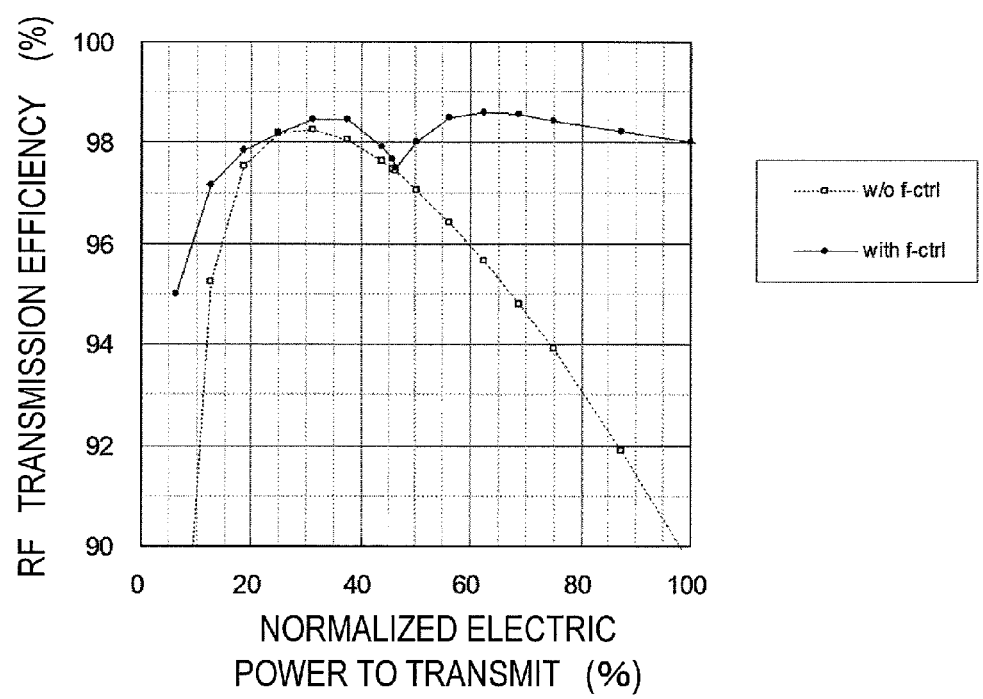
FIG. 23 is a graph showing how the transmission efficiency changes when the transmission frequency is controlled (with f-ctrl) and when the transmission frequency is not controlled (w/o f-ctrl) in a situation where k=0.3 and fs/fp=0.922.

FIG. 23 is a graph showing how the transmission efficiency changes when the transmission frequency is controlled (with f-ctrl) and when the transmission frequency is not controlled (w/o f-ctrl) in a situation where k=0.3 and fs/fp=0.922. Unless the transmission frequency is controlled, a steep decrease in transmission efficiency is seen in a range where the electric power to transmit is relatively large. It can be seen, however, that if the transmission frequency is controlled and changed as shown in FIG. 9B, the transmission efficiency when a lot of electric power is transmitted can be improved significantly.

Comparative Examples 1 and 2

Figure 24:
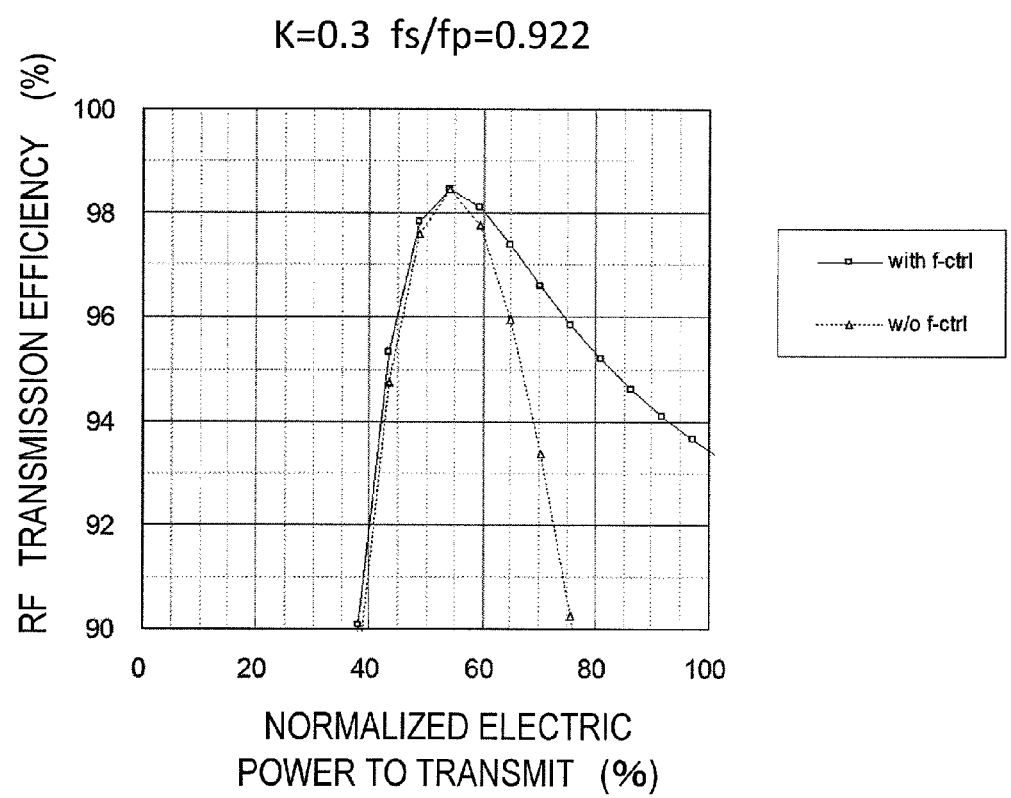
FIG. 24 shows the dependence of the transmission efficiency on the electric power to transmit in Comparative Example 1.

Although the power transmitting and power receiving antennas of Example 1 have an asymmetric resonant circuit configuration, the power transmitting and power receiving antennas had a symmetric resonant circuit configuration in these Comparative Examples 1 and 2. Specifically, in Comparative Example 1, both of the power transmitting and power receiving antennas were implemented as series resonant circuits. On the other hand, in Comparative Example 2, both of the power transmitting and power receiving antennas were implemented as parallel resonant circuits. In these comparative examples, evaluations were made in the same way as in Example 1, thereby deriving the maximum transmission efficiency at each electric power to transmit when the apparatus was operated with a constant voltage applied and a transmission frequency that would maximize the transmission efficiency (peak frequency). In this case, k was set to be 0.3 and fs/fp was set to be 0.922. FIG. 24 shows the dependence of the transmission efficiency on the electric power to transmit in Comparative Example 1. As can be seen easily from FIG. 24, the transmission efficiency is high only in a narrow range in Comparative Example 1. Also, even if the transmission frequency is controlled, the transmission efficiency is improved only a little.

Figure 25:
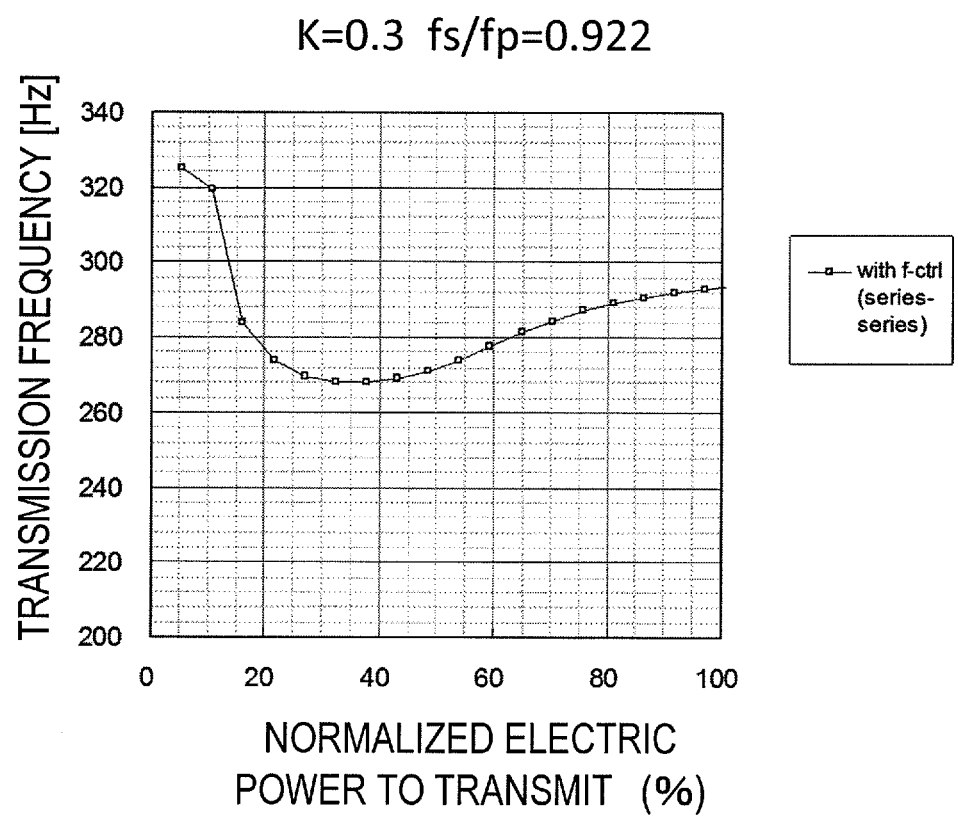
FIG. 25 is a graph showing how the transmission frequency changes with the electric power to transmit in Comparative Example 1.
Figure 26:
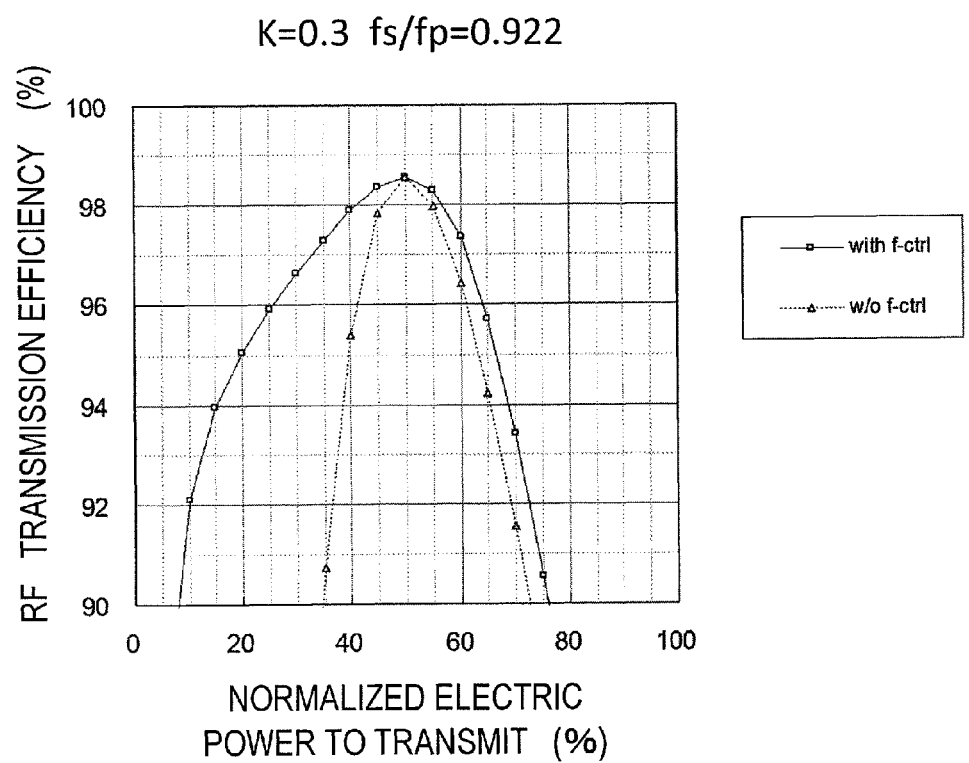
FIG. 26 shows the dependence of the transmission efficiency on the electric power to transmit in Comparative Example 2.
Figure 27:
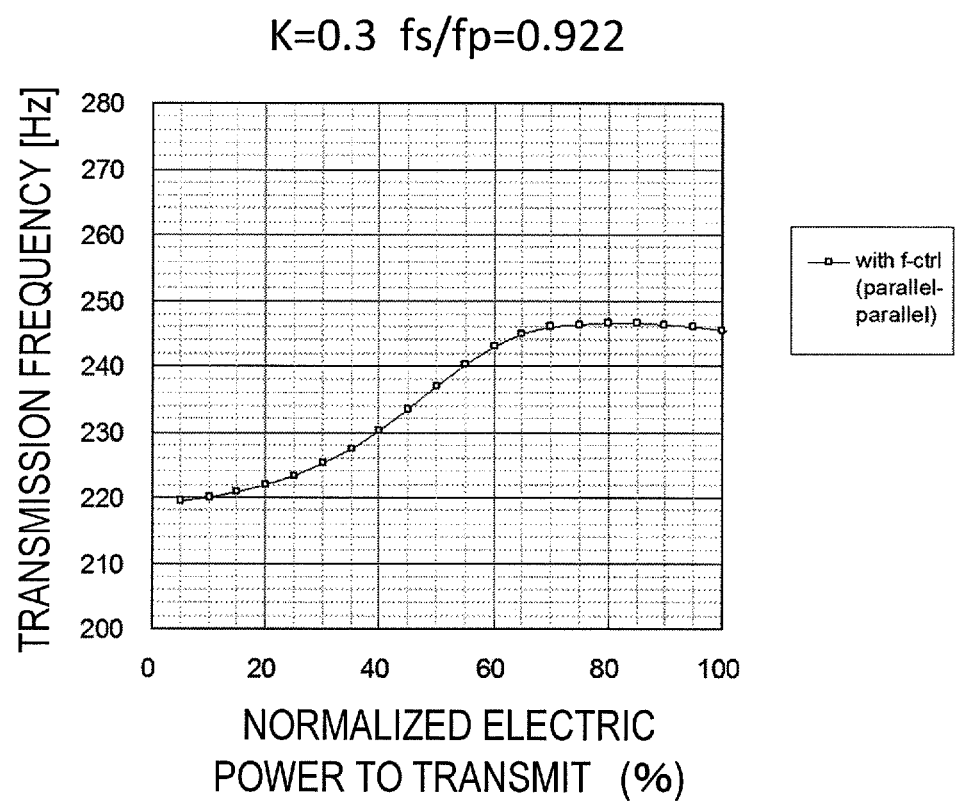
FIG. 27 is a graph showing how much the transmission frequency depends on the electric power to transmit in Comparative Example 2.

FIG. 25 is a graph showing how the transmission frequency changes with the electric power to transmit in Comparative Example 1. As can be seen easily from FIG. 25, in Comparative Example 1, as the electric power to transmit decreases, the transmission frequency becomes far higher than the even mode resonant frequency of 302 kHz, which did not follow the frequency control condition of the present disclosure. The transmission efficiency of Comparative Example 2, of which the power transmitting and power receiving antennas were both implemented as parallel resonant circuits, is shown in FIG. 26 and the dependence of its transmission frequency on the electric power to transmit is shown in FIG. 27. As can be seen from these drawings, the effects of the embodiment of the present disclosure were not achieved in Comparative Example 2, either.

Comparative Example 3

Figure 28:
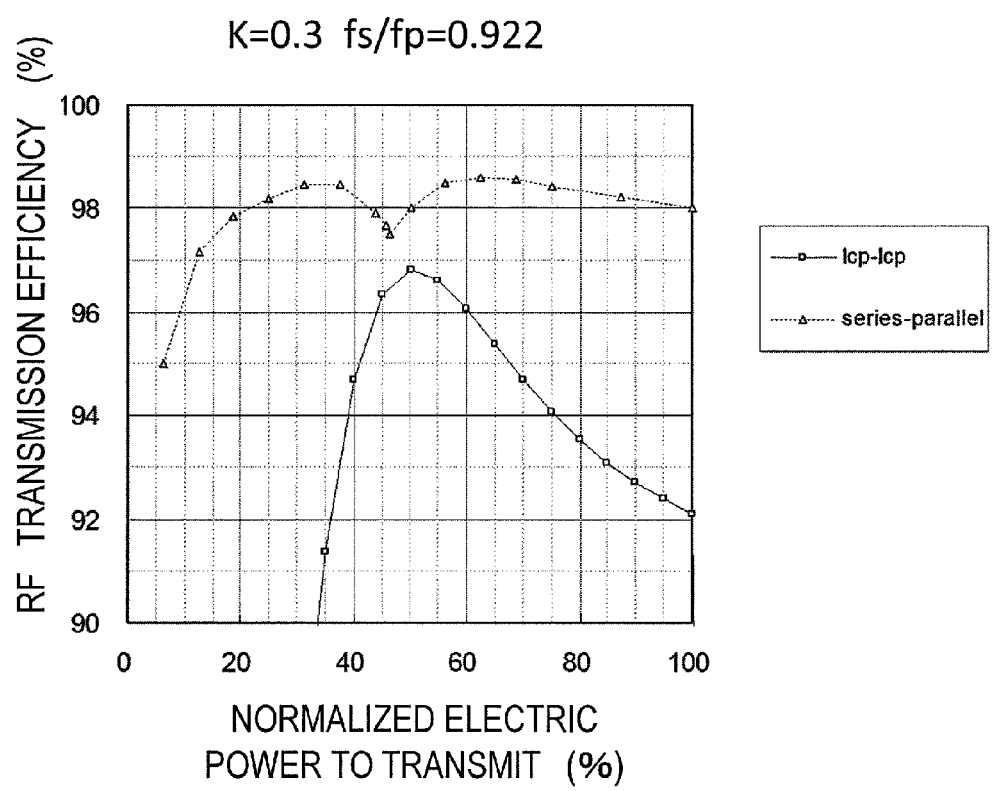
FIG. 28 is a graph showing the dependences of the transmission efficiency on the electric power to transmit in Comparative Example 3 and in Example 1.
Figure 29:
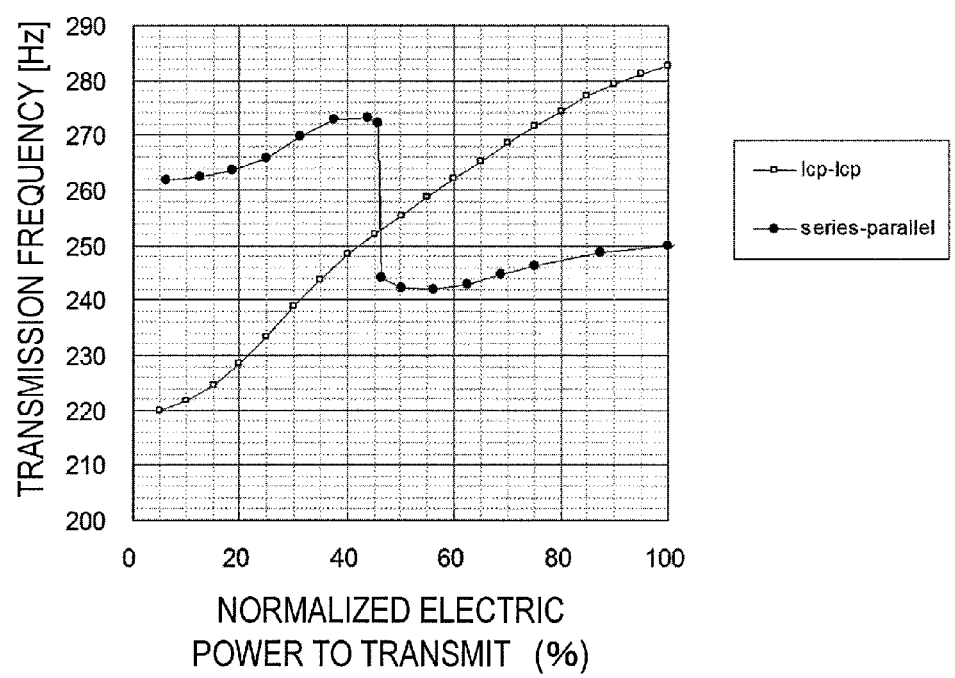
FIG. 29 is a graph showing the dependences of the transmission frequency on the electric power to transmit in Comparative Example 3 and in Example 1.

In Example 1, a signal is supplied from an external circuit to the power transmitting and power receiving antennas by directly connecting an RF input/output terminal for measuring to the power transmitting and power receiving antennas. In this Comparative Example 3, on the other hand, a signal was supplied from an external circuit to the power transmitting and power receiving antennas based on the principle of electromagnetic induction. Specifically, a pair of non-resonant coils, which were arranged 3 mm away from the power transmitting and power receiving antennas to face each other and which each had a diameter of 20 cm and a number of turns of six, were used and excited by an external circuit, thereby exciting the power transmitting and power receiving antennas with the non-resonant coils by a non-contact method. Then, evaluation was made in the same way as in Example 1, thereby calculating not only the maximum transmission efficiency at each electric power to transmit during a constant voltage operation but also a transmission frequency that would maximize the transmission efficiency. The dependences of the transmission efficiency on the electric power to transmit in this Comparative Example 3 and in Example 1 are shown in FIG. 28. As can be seen from FIG. 28, in Comparative Example 3, as the electric power to transmit decreases, the maximum transmission efficiency decreases steeply. Also, as can be seen from FIG. 29, in Comparative Example 3, as the electric power to transmit increases, the transmission frequency rises monotonically, which did not follow the frequency control condition of the embodiment of the present disclosure. This result reveals that the configuration of Comparative Example 3 copes with a variation in electric power to transmit by using only an odd-mode resonance. That is to say, this proved that the principle of operation of Comparative Example 3 was different from that of the embodiment of the present disclosure that makes full use of the even and odd resonance modes.

Comparative Examples 4 and 5

In Comparative Examples 4 and 5, electric power was supplied directly to one of the power transmitting and power receiving antennas but supplied to the other antenna by electromagnetic induction. The direct power supply was carried out under the same condition as in Example 1, while the power supply by electromagnetic induction was carried out under the same condition as in Comparative Example 3. The following Table 1 summarizes the respective circuit configurations of Example 1 and Comparative Examples 1 to 5 in comparison.

Figure 30:
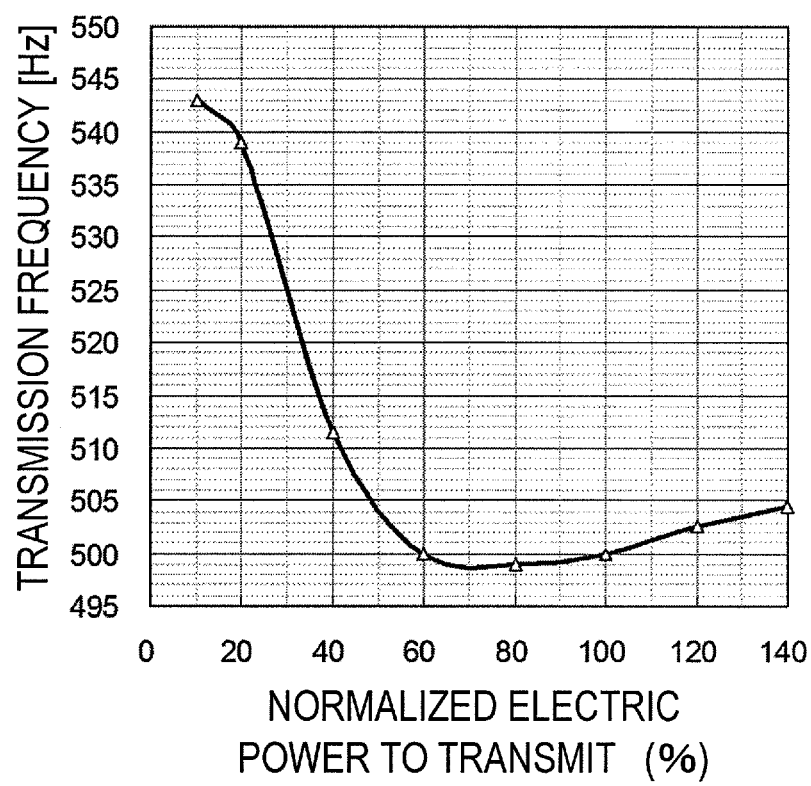
FIG. 30 shows the dependence of the transmission efficiency on the electric power to transmit in Comparative Examples 4 and 5.
Figure 31:
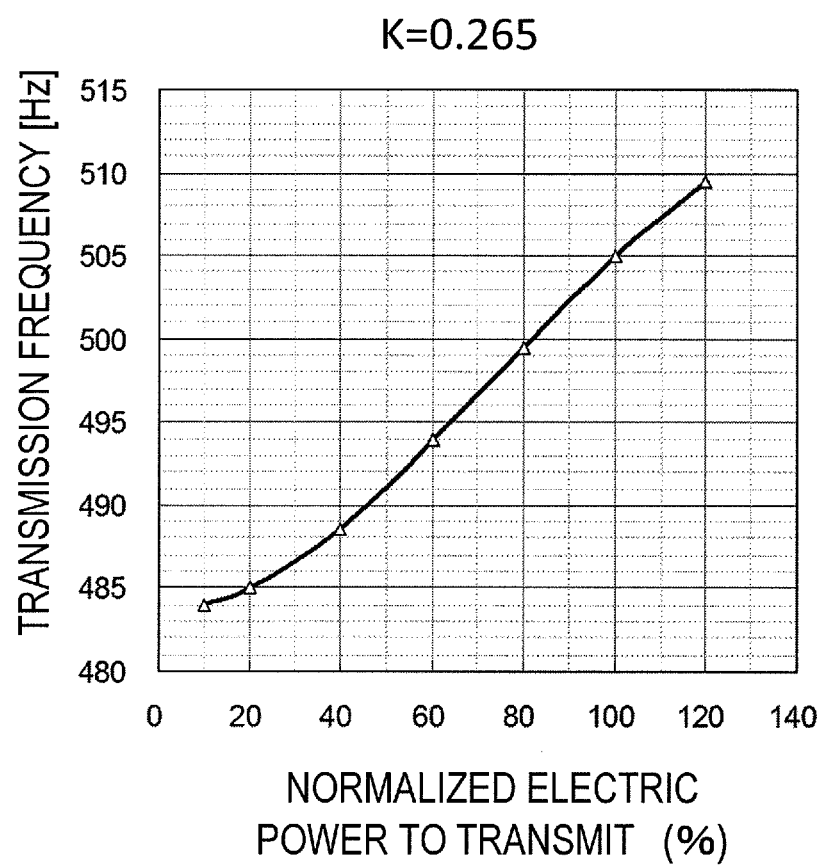
FIG. 31 is a graph showing how much the transmission frequency depends on the electric power to transmit in Comparative Example 5.

As for Comparative Examples 4 and 5, evaluation was made in the same way as in Example 1, thereby calculating not only the maximum transmission efficiency at each electric power to transmit during a constant voltage operation but also a transmission frequency that would maximize the transmission efficiency. As can be seen easily from FIG. 30, in Comparative Example 4, as the electric power to transmit decreases, the transmission frequency tends to rise, which did not follow the frequency control condition of the embodiment of the present disclosure. Likewise, as can be seen easily from FIG. 31, which shows the dependence of the transmission frequency on the electric power to transmit in Comparative Example 5, the frequency control condition of the embodiment of the present disclosure was not satisfied in Comparative Example 5, either.

TABLE 1

| | Distance (cm) | k | Power transmitting antenna | Power receiving antenna | Effect of this invention/ frequency control |
|---|---|---|---|---|---|
| Example 1 | | | Series resonant circuit | Parallel resonant circuit | Achieved/ satisfied |
| Com. Ex. 1 | 5 | 0.265 | Series resonant circuit | Series resonant circuit | |
| Com. Ex. 2 | | | Parallel resonant circuit | Parallel resonant circuit | Not achieved/ not satisfied |
| Com. Ex. 3 | | | Electro- magnetic induction power supply type | Electromagnetic induction power supply type | |
| Com. Ex. 4 | | | | Series resonant circuit | |
| Com. Ex. 5 | | | | Parallel resonant circuit | |

A wireless electric power transmission apparatus as an embodiment of the present disclosure can be used as a power supplying system for supplying power to various devices (including a TV set and other audiovisual devices and washers, refrigerators, air conditioners and other household electronic appliances) which can operate with power supplied from a power supply circuit that applies a constant voltage.

In addition, the wireless electric power transmission apparatus of the present disclosure is also applicable as a charging system for various electronic devices, electric motorcycles, electric bicycles, and electric cars that use a rechargeable battery. This is because a rechargeable battery such as a lithium battery sometimes needs to have its charge operation controlled at a constant voltage. Furthermore, the system of the present disclosure is also applicable for use in any electronic device with a motor to be driven at a constant voltage.

Moreover, it is known that if the intensity (or illuminance) of sunlight that irradiates a solar cell in a solar power generation system changes, the maximum power point (i.e., a current or voltage value at which the maximum power can be generated) is substantially proportional to illuminance as for current and becomes almost constant as for voltage. Consequently, a wireless electric power transmission apparatus as an embodiment of the present disclosure is also applicable to a system that collects the power that has been generated by a solar power generation system.

While the exemplary embodiments of the invention has been described, it will be apparent to those skilled in the art that the disclosed exemplary embodiments may be modified in numerous ways and may assume many embodiments other than those specifically described above. Accordingly, it is intended by the appended claims to cover all modifications of the exemplary embodiments that fall within the true spirit and scope of the invention.

What is claimed is:

1. A wireless electric power transmission apparatus comprising:
    two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp;
    an oscillator which is connected to one of the two antennas that transmits RF power; and
    a control section which controls a transmission frequency according to the magnitude of the electric power to be transmitted from one of the two antennas to the other, wherein fs/fp is set to be a value that is less than one.

2. The wireless electric power transmission apparatus of claim 1, wherein the control section changes a relation between the transmission frequency and the electric power according to a standard value that depends on a coupling coefficient k between the two antennas and fs/fp.

3. The wireless electric power transmission apparatus of claim 2, wherein in a situation where the fs/fp value is less than the standard value, the control section sets the transmission frequency to be a value that falls within a first frequency range if the electric power is smaller than a reference value P1 but sets the transmission frequency to be a value that falls within a second frequency range, which is lower than the first frequency range, if the electric power is greater than the reference value P1.

4. The wireless electric power transmission apparatus of claim 2, wherein in a situation where the fs/fp value is greater than the standard value, the control section sets the transmission frequency to be a value that falls within a first frequency range if the electric power is greater than a reference value P1 but sets the transmission frequency to be a value that falls within a second frequency range, which is lower than the first frequency range, if the electric power is smaller than the reference value P1.

5. The wireless electric power transmission apparatus of claim 1, wherein in a situation where the fs/fp value is greater than a standard value that depends on the coupling coefficient k, the control section sets the transmission frequency to be a value that falls within a first frequency range if the electric power is greater than a reference value P1 but sets the transmission frequency to be a value that falls within a second frequency range, which is lower than the first frequency range, if the electric power is smaller than the reference value P1, and wherein in a situation where the fs/fp value is less than the standard value, the control section sets the transmission frequency to be a value that falls within a first frequency range that is lower than the frequency fp if the electric power is greater than the reference value P1 but sets the transmission frequency to be a value that falls within a second frequency range, which is higher than the first frequency range, if the electric power is smaller than the reference value P1.

6. The wireless electric power transmission apparatus of claim 5, wherein if the fs/fp value agrees with the standard value that depends on the coupling coefficient k, the control section keeps the transmission frequency constant irrespective of the electric power to transmit.

7. The wireless electric power transmission apparatus of claim 2, wherein the standard value is a monotonically decreasing function of the coupling coefficient k.

8. The wireless electric power transmission apparatus of claim 7, wherein the standard value is less than one and its magnitude is between $-0.7309 \times k^2 - 0.0269 \times k + 0.9862$ and $0.08 \times k^2 - 0.357 \times k + 1.0944$.

9. The wireless electric power transmission apparatus of claim 1, wherein the control section measures transmission efficiency by transmitting electric power wirelessly with the transmission frequency changed in multiple different control patterns, thereby determining a transmission frequency control pattern that would maximize the transmission efficiency.

10. The wireless electric power transmission apparatus of claim 1, wherein the control section estimates whether the transmission efficiency increases or decreases as the transmission frequency rises or falls with respect to at least one value of the electric power to transmit and determines a transmission frequency control pattern based on the result of the estimation.

11. The wireless electric power transmission apparatus of claim 1, wherein the two antennas have a resonant frequency adjustment function to change at least one of fs and fp, and wherein the control section changes the fs/fp value after the wireless electric power transmission apparatus has been installed.

12. The wireless electric power transmission apparatus of claim 11, wherein after the wireless electric power transmission apparatus has been installed, the control section transmits electric power wirelessly with fs/fp set to be multiple different values, measures transmission efficiency, and then determines an fs/fp value for a normal operation based on the transmission efficiency.

13. A power transmitting device for use in the wireless electric power transmission apparatus of claim 1, comprising:
one of the two antennas configured to transmit RF power; and
an oscillator that is connected to the antenna.

14. A power receiving device for use in the wireless electric power transmission apparatus of claim 1, comprising one of the two antennas configured to receive RF power.

15. A controller for use in the wireless electric power transmission apparatus of claim 1, configured to control the resonant frequency according to the magnitude of the electric power to be transmitted from one of the two antennas to the other.

* * * * *